US012736426B2

(12) United States Patent
Tee et al.

(10) Patent No.: US 12,736,426 B2

(45) Date of Patent: Sep. 15, 2026

(54) SENSING SYSTEM USING TIME-VARYING MAGNETIC FIELDS

(71) Applicant: NATIONAL UNIVERSITY OF SINGAPORE, Singapore (SG)

(72) Inventors: Chee Keong Tee, Singapore (SG); Hian Hian See, Singapore (SG); Si Li, Singapore (SG); Aeree Kim, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 345 days.

(21) Appl. No.: 18/552,493

(22) PCT Filed: Mar. 25, 2022

(86) PCT No.: PCT/SG2022/050166

§ 371 (c)(1),
(2) Date: Sep. 26, 2023

(87) PCT Pub. No.: WO2022/203610

PCT Pub. Date: Sep. 29, 2022

(65) Prior Publication Data

US 2024/0159610 A1 May 16, 2024

(30) Foreign Application Priority Data

Mar. 26, 2021 (SG) ............................ 10202103161S

(51) Int. Cl.
*G01L 9/14* (2006.01)
*G01L 9/00* (2006.01)

(52) U.S. Cl.
CPC ................ *G01L 9/14* (2013.01); *G01L 9/007* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 6,279,406 B1 * 8/2001 Li .......................... G01R 33/18 73/861.08
6,798,090 B2 * 9/2004 Cheung .................. H02K 35/02 322/3
(Continued)

FOREIGN PATENT DOCUMENTS

CA 3073198 A1 2/2019
CN 101297357 A 10/2008
(Continued)

OTHER PUBLICATIONS

Xie, S. et al. “High Sensitivity and Wide Range Soft Magnetic Tactile Sensor Base don Electromagnetic Induction” IEEE Sensors Journal, Feb. 1, 2021, vol. 21, No. 3, pp. 2757-2766.
(Continued)

*Primary Examiner* — Andre J Allen
(74) *Attorney, Agent, or Firm* — Volpe Koenig

(57) ABSTRACT

A system for generating an electrical signal responsive to a pressure input, a sensory system, and a method for generating an electrical signal responsive to a pressure input. The system comprises a diaphragm configured to be subjected to the pressure input; a microfluidic channel with a first end thereof coupled to the diaphragm such that the pressure input generates a corresponding pressure change in the microfluidic channel; one or more magnets disposed in a carrier liquid in the microfluidic channel; and one or more coils disposed along the microfluidic channel and for generating the electrical signal based on Faraday effect by the
(Continued)

magnets moving, under the pressure change in the microfluidic channel, through the respective coils.

13 Claims, 18 Drawing Sheets

(58) Field of Classification Search
CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/00; G01L 13/026; G01L 11/008; G01L 7/22; G01L 9/0047; G01L 7/08; G01L 9/0076; G01L 9/0025; G01L 9/04; G01L 9/0035; G01L 19/0061; G01L 9/0005; G01L 9/0041; G01L 9/08; G01L 9/0019; G01L 9/10; G01L 21/00; G01L 9/00; G01L 11/006; G01L 19/06; G01L 19/086; G01L 9/0008; G01L 1/18; G01L 11/004; G01L 19/069; G01L 9/0057; G01L 19/083; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 13/04; G01L 23/32; G01L 7/14; G01L 1/165; G01L 23/12; G01L 1/241; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/00; G01L 1/04; G01L 1/242; G01L 21/24; G01L 3/10; G01L 5/0004; G01L 5/0052; G01L 5/24; G01L 7/10; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/12225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 5/106
USPC .................................................... 73/700–756
See application file for complete search history.

(56) References Cited

U.S. PATENT DOCUMENTS

| | | | | |
|---|---|---|---|---|
| 9,415,219 | B2 | 8/2016 | Simon | |
| 10,220,207 | B2 | 3/2019 | Simon | |
| 2006/0174711 | A1* | 8/2006 | Mori | G01L 9/16 73/731 |
| 2015/0222166 | A1 | 8/2015 | Kim | |

(56) References Cited

U.S. PATENT DOCUMENTS

| | | | |
|---|---|---|---|
| 2016/0033343 | A1 | 2/2016 | Park |
| 2018/0335323 | A1 | 11/2018 | Lu |
| 2019/0001139 | A1 | 1/2019 | Mishra |

FOREIGN PATENT DOCUMENTS

| | | | | |
|---|---|---|---|---|
| CN | 102803914 | A | 11/2012 | |
| CN | 103148976 | A | 6/2013 | |
| CN | 106353028 | A | 1/2017 | |
| KR | 20190065881 | A | 6/2019 | |
| WO | WO-2009098970 | A1 * | 8/2009 | .............. B60K 6/26 |
| WO | 2019036539 | A1 | 2/2019 | |

OTHER PUBLICATIONS

Baik, Sangyul, et al. "A wet-tolerant adhesive patch inspired by protuberances in suction cups of octopi." Nature 546.7658 (2017): 396-400.

Kim, Min Sung, et al. "An aquatic-vision-inspired camera based on a monocentric lens and a silicon nanorod photodiode array." Nature Electronics (2020): 1-8.

Reader, Tom W., and Paul O'Connor. "The Deepwater Horizon explosion: non-technical skills, safety culture, and system complexity." Journal of Risk Research 17.3 (2014): 405-424.

Boord, Robert L., and C. B. G. Campbell. "Structural and functional organization of the lateral line system of sharks." American Zoologist 17.2 (1977): 431-441.

Flock, Åke. "8 The Lateral Line Organ Mechanoreceptors." Fish physiology. vol. 5. Academic Press, 1971. 241-263.

Bleckmann, Horst, and Randy Zelick. "Lateral line system of fish." Integrative zoology 4.1 (2009): 13-25.

Lee, Wang Wei, et al. "A neuro-inspired artificial peripheral nervous system for scalable electronic skins." Science Robotics 4.32 (2019): eaax2198.

Posch, Christoph, Daniel Matolin, and Rainer Wohlgenannt. "A QVGA 143 dB dynamic range frame-free PWM image sensor with lossless pixel-level video compression and time-domain CDS." IEEE Journal of Solid-State Circuits 46.1 (2010): 259-275.

Truong, Son Ngoc, Seok-Jin Ham, and Kyeong-Sik Min. "Neuromorphic crossbar circuit with nanoscale filamentary- switching binary memristors for speech recognition." Nanoscale research letters 9.1 (2014): 629.

Bao, Zhenan. "Skin-inspired organic electronic materials and devices." MRS Bulletin 41.11 (2016): 897.

Tee, Benjamin C-K., et al. "A skin-inspired organic digital mechanoreceptor." Science 350.6258 (2015): 313-316.

Wang, Xu, et al. "Untethered and ultrafast soft-bodied robots." Communications Materials 1.1 (2020): 1-10.

Hu, Wenqi, et al. "Small-scale soft-bodied robot with multimodal locomotion." Nature 554.7690 (2018): 81-85.

Mirvakili, Seyed M., et al. "Actuation of untethered pneumatic artificial muscles and soft robots using magnetically induced liquid-to-gas phase transitions." Science Robotics 5.41 (2020).

Wu, Yuanzhao, et al. "A skin-inspired tactile sensor for smart prosthetics." Science Robotics 3.22 (2018): eaat0429.

Schaefer, Brian T., et al. "Magnetic field detection limits for ultraclean graphene Hall sensors." Nature Communications 11.1 (2020): 1-8.

Gava, Giuseppe P., et al. "Integrating new memories into the hippocampal network activity space." Nature Neuroscience (2021): 1-5.

Hunsberger, Eric, and Chris Eliasmith. "Training spiking deep networks for neuromorphic hardware." arXiv preprint arXiv:1611.05141 (2016).

LeCun, Yann, Yoshua Bengio, and Geoffrey Hinton. "Deep learning." nature 521.7553 (2015): 436-444.

Umbanhowar, P. B., V. Prasad, and David A. Weitz. "Monodisperse emulsion generation via drop break off in a coflowing stream." Langmuir 16.2 (2000): 347-351.

Rumens, C. V., et al. "Swelling of PDMS networks in solvent vapours; applications for passive RFID wireless sensors." Journal of Materials Chemistry C 3.39 (2015): 10091-10098.

Baled, Hseen O., et al. "Exploratory characterization of a perfluoropolyether oil as a possible viscosity standard at deepwater production conditions of 533 K and 241 MPa." International Journal of Thermophysics 34.10 (2013): 1845-1864.

Choong, Chwee-Lin, et al. "Highly stretchable resistive pressure sensors using a conductive elastomeric composite on a micropyramid array." Advanced materials 26.21 (2014): 3451-3458.

Khatib, Oussama, et al. "Ocean one: A robotic avatar for oceanic discovery." IEEE Robotics & Automation Magazine 23.4 (2016): 20-29.

Davies, Mike, et al. "Loihi: A neuromorphic manycore processor with on-chip learning." IEEE Micro 38.1 (2018): 82-99.

Aubin, Cameron A., et al. "Electrolytic vascular systems for energy-dense robots." Nature 571.7763 (2019): 51-57.

Rothemund, P., Kellaris, N., Mitchell, S. K., Acome, E., Keplinger, C., HASEL Artificial Muscles for a New Generation of Lifelike Robots—Recent Progress and Future Opportunities. Adv. Mater. 2020, 2003375.

Teppei Araki, Lukas M Bongartz, Taro Kaiju, Ashuya Takemoto, Shuichi Tsuruta, Takafumi Uemura and Tsuyoshi Sekitani, Flexible neural interfaces for brain implants—the pursuit of thinness and high density. Flex. Print. Electron. 5 043002, 2020.

Frank, James A., Marc-Joseph Antonini, and Polina Anikeeva. "Next-generation interfaces for studying neural function." Nature biotechnology 37.9 (2019): 1013-1023.

Furlani, Edward P. Permanent magnet and electromechanical devices: materials, analysis, and applications. Academic press, 2001.

Li, Qin, et al. "Metaplasticity mechanisms restore plasticity and associativity in an animal model of Alzheimer's disease." Proceedings of the National Academy of Sciences 114.21 (2017): 5527-5532.

Sajikumar, Sreedharan, Sheeja Navakkode, and Julietta Uta Frey. "Protein synthesis-dependent long-term functional plasticity: methods and techniques." Current opinion in neurobiology 15.5 (2005): 607-613.

Pang, Changhyun et al. "Sensors: Highly Skin-Conformal Microhairy Sensor For Pulse Signal Amplification (Adv. Mater. Apr. 2015)". Advanced Materials, vol. 27, No. 4, 2015, pp. 589-589. Wiley, doi:10.1002/adma.201570020.

Boutry, Clementine M et al. "Pressure Sensors: A Sensitive and Biodegradable Pressure Sensor Array for Cardiovascular Monitoring (Adv. Mater. 43/2015)". Advanced Materials, vol. 27, No. 43, 2015, pp. 6953-6953. Wiley, doi:10.1002/adma.201570294.

Zhao, Xiaoli et al. "Flexible, Stretchable and Wearable Multifunctional Sensor Array as Artificial Electronic Skin for Static and Dynamic Strain Mapping". Advanced Electronic Materials, vol. 1, No. 7, 2015, p. 1500142. Wiley, doi:10.1002/aelm.201500142.

Mannsfeld, Stefan C. B et al. "Highly Sensitive Flexible Pressure Sensors With Microstructured Rubber Dielectric Layers". Nature Materials, vol. 9, No. 10, 2010, pp. 859-864. Springer Science and Business Media LLC, doi:10.1038/nmat2834.

Tee, Benjamin C.-K. et al. "Tunable Flexible Pressure Sensors Using Microstructured Elastomer Geometries for Intuitive Electronics". Advanced Functional Materials, vol. 24, No. 34, 2014, pp. 5427-5434. Wiley, doi:10.1002/adfm.201400712.

Kim, Hyeohn et al. "Transparent, Flexible, Conformal Capacitive Pressure Sensors With Nanoparticles". Small, vol. 14, No. 8, 2018, p. 1703432. Wiley, doi:10.1002/smll.201703432.

Wang, Jun et al. "A Highly Sensitive and Flexible Pressure Sensor With Electrodes and Elastomeric Interlayer Containing Silver Nanowires". Nanoscale, vol. 7, No. 7, 2015, pp. 2926-2932. Royal Society of Chemistry (RSC), doi:10.1039/c4nr06494a.

Liao, Xinqin et al. "Flexible and Highly Sensitive Strain Sensors Fabricated by Pencil Drawn for Wearable Monitor". Advanced Functional Materials, vol. 25, No. 16, 2015, pp. 2395-2401. Wiley, doi:10.1002/adfm.201500094.

Kang, Daeshik et al. "Ultrasensitive Mechanical Crack-Based Sensor Inspired by the Spider Sensory System". Nature, vol. 516, No. 7530, 2014, pp. 222-226. Springer Science and Business Media LLC, doi:10.1038/nature14002.

(56) References Cited

OTHER PUBLICATIONS

Hua, Qilin et al. "Skin-Inspired Highly Stretchable and Conformable Matrix Networks for Multifunctional Sensing". Nature Communications, vol. 9, No. 1, 2018. Springer Science and Business Media LLC, doi:10.1038/s41467-017-02685-9.

Chun, Sungwoo et al. "Self-Powered Pressure- and Vibration-Sensitive Tactile Sensors for Learning Technique-Based Neural Finger Skin". Nano Letters, vol. 19, No. 5, 2019, pp. 3305-3312. American Chemical Society (ACS), doi:10.1021/acs.nanolett.9b00922.

Mirzanejad, Hossein, and Mahdi Agheli. "Soft Force Sensor Made of Magnetic Powder Blended With Silicone Rubber". Sensors and Actuators A: Physical, vol. 293, 2019, pp. 108-118. Elsevier BV, doi:10.1016/j.sna.2019.04.021.

Dong, Kai, and Jianan Deng. "A Stretchable Yarn Embedded Triboelectric Nanogenerator as Electronic Skin for Biomechanical Energy Harvesting and Multifunctional Pressure Sensing". Advanced Mateirals, vol. 30, No. 43, 2020, doi:10.1002/adma.201804944. Accessed Dec. 10, 2020.

Oh, S., et al. "Remote tactile sensing system integrated with magnetic synapse" Scientific Reports vol. 7, Article No. 16963 (2017) <<https://www.nature.com/articles/s41598-017-17277-2\ <<retrieved Nov. 13, 2023>>.

Chun, K., et al. "A_Self-Powered_Sensor_Mimicking_Slow-_and_Fast-Adapting_Cutaneous_Mechanoreceptors" Feb. 2018Advanced Materials 30(12):1706299. https://www.researchgate.net/publication/323053480.

Zhang, B., et al. "A Magnetostrictive Tactile Sensing Unit and the Integration of Sensor Array for Intelligent Maniuplator" IEEE Access, vol. 8, 2020. https://ieeexplore.ieee.org/stamp/stamp.jsp?arnumber=9223721 <<retrieved Nov. 13, 2023 >>.

Alfadhel, A., et al. "Magnetic Nanocomposite Cilia Tactile Sensor"https://onlinelibrary.wiley.com/doi/10.1002/adma.201504015 <<retrieved Nov. 13, 2023>>.

Al-Handarish, Y., et al. "A Survey of Tactile-Sensing Systems and Their Applications in Biomedical Engineering" Hindawai. Advances in Materials Science and Engineering. vol. 2020. https://www.hindawi.com/journals/amse/2020/4047937/ <<retrieved Nov. 13, 2023>>.

* cited by examiner

1100

SENSING SYSTEM USING TIME-VARYING MAGNETIC FIELDS

FIELD OF INVENTION

The present invention relates broadly to a sensing system using time-varying magnetic fields for intelligent-, robotic-, and underwater-tactile and pressure sensing.

BACKGROUND

Any mention and/or discussion of prior art throughout the specification should not be considered, in any way, as an admission that this prior art is well known or forms part of common general knowledge in the field.

Neuromorphic devices have been developed to mimic biological spike-based sensing to achieve highly efficient functions, e.g., tactile sensing, visual processing, and speech recognition. However, many of these devices rely on digital circuits, silicon micro-technology, and software to convert the analog output signals from the sensors to spikes. Some organic neuromorphic devices have also been proposed, but they still require silicon-based integrated circuits to generate the electrical pulses.

Notably, none of the neuromorphic devices were investigated for underwater pressure sensing.

The sensing mechanisms of many tactile- and pressure-sensors are based on piezocapacitive-, piezoresistive-, Hall-, and Giant Magnetoimpedance(GMI)-effect. However, these transduction principles suffer from low/limited linearity, and require external power-sourcing and measuring unit to read the pressure-induced output signals.

Power consumption is an important consideration for real-world applications, and this has spurred research interest in developing tactile- and pressure-sensors that are self-powered. However, the output signals for these sensors (e.g., triboelectric-based sensors) remain challenging to predict and quantify.

Embodiments of the present invention provide seek to address at least one of the above problems.

SUMMARY

In accordance with a first aspect of the present invention, there is provided a system for generating an electrical signal responsive to a pressure input is provided, the system comprising a diaphragm configured to be subjected to the pressure input; a microfluidic channel with a first end thereof coupled to the diaphragm such that the pressure input generates a corresponding pressure change in the microfluidic channel; one or more magnets disposed in a carrier liquid in the microfluidic channel; and one or more coils disposed along the microfluidic channel and for generating the electrical signal based on Faraday effect by the magnets moving, under the pressure change in the microfluidic channel, through the respective coils.

In accordance with a second aspect of the present invention, there is provided a sensory system comprising a plurality of the systems for generating an electrical signal responsive to a pressure input according to the first aspect.

In accordance with a third aspect of the present invention, there is provided method for fabricating a system for generating an electrical signal responsive to a pressure input, comprising the steps of providing a diaphragm configured to be subjected to the pressure input; providing a microfluidic channel and coupling a first end thereof to the diaphragm such that the pressure input generates a corresponding pressure change in the microfluidic channel; disposing one or more magnets in a carrier liquid in the microfluidic channel; and disposing one or more coils along the microfluidic channel for generating the electrical signal based on Faraday effect by the magnets moving, under the pressure change in the microfluidic channel, through the respective coils.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 17(A) illustrates investigating the stability of the micro-magnets under different temperature (i.e., 4° C., 25° C. and 50° C.) according to example embodiments.

FIG. 17(B) illustrates investigating the magnetic flux density stability of the micro-magnets subjected to physical impact for 15 hours, according to example embodiments.

FIG. 17(C) illustrates investigating the magnetic flux density stability of the micro-magnets under liquid mediums (GPL 101 oil), according to example embodiments.

DETAILED DESCRIPTION

Figures 1A, 1B, 2A, 2B:
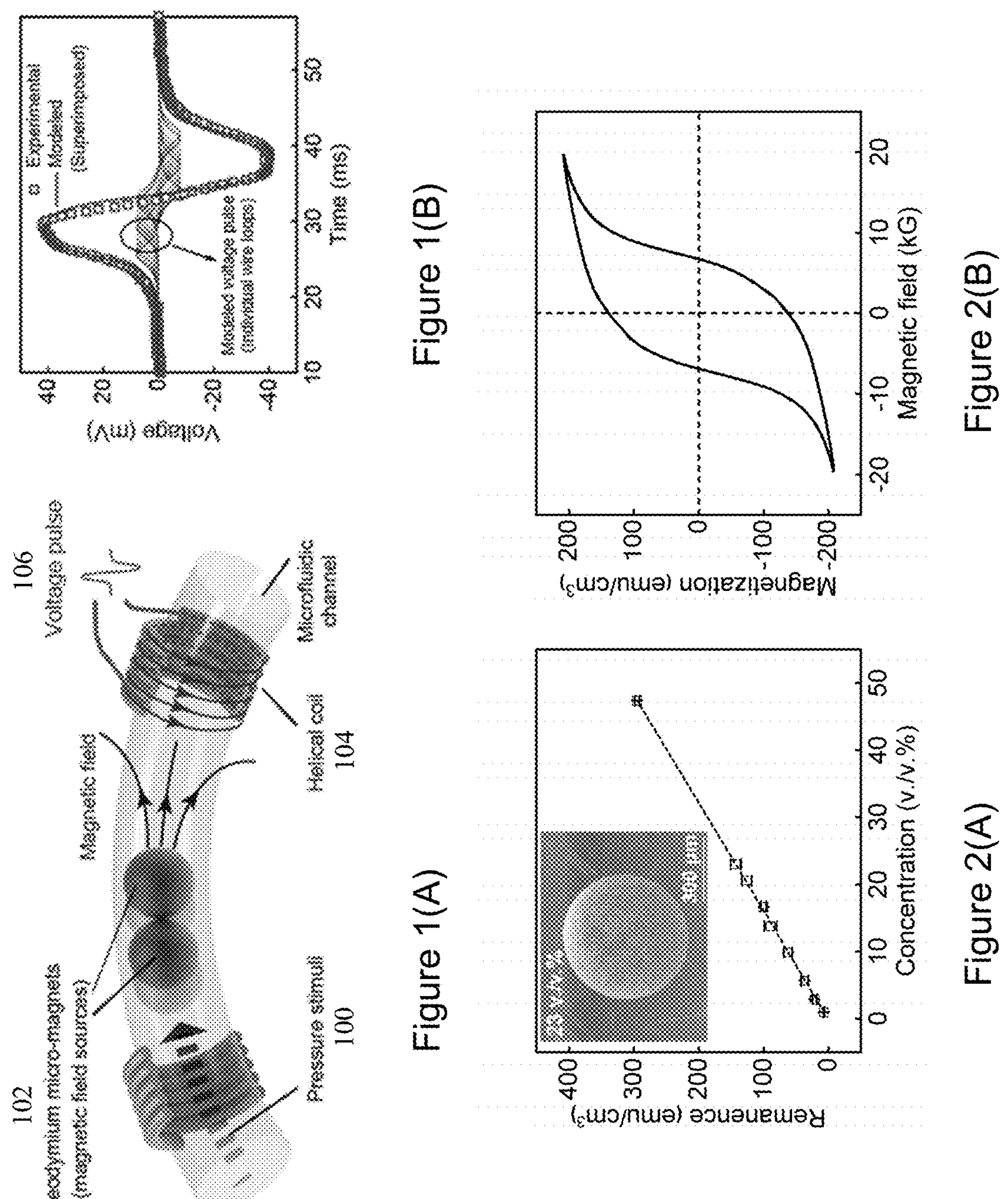
FIG. 1(A) shows an illustration of the transduction principle according to an example embodiment.
FIG. 1(B) shows the representative evoked voltage pulse of the micro-magnets flowing through a helical coil, according to an example embodiment.
FIG. 2(A) shows the remanence of the micro-magnets with various magnetic concentrations measured using a vibrating sample magnetometer, according to example embodiments.
FIG. 2(B) shows the hysteresis loop of the micro-magnets with NdFeB powder of 23 v./v. %, according to an example embodiment.

According to an example embodiment of the present invention, a neuromorphic sensing system using time-varying magnetic fields to capture and transmit sensory information in the form of voltage pulses is provided. The sensing system according to an example embodiment intrinsically generates voltage pulses that closely mimic action potentials. The transduction design of the system according to an example embodiment is based on the Faraday's law of electromagnetic induction; it uses magnetic materials to produce time-varying magnetic fields while traversing through a helical conducting coil, e.g. a copper coil, to evoke voltage pulses. By using this type of self-powered spike-based pressure sensing strategy, the system (i.e, the sensor) according to an example embodiment can encode mechanical stimuli into distinct combinatorial voltage pulse sequences. It is noted that the design and performance of the sensor can be developed to suit different applications in various example embodiments.

Example embodiments described herein demonstrate the sensor using the abovementioned sensing strategy for a range of applications from underwater pressure sensing to direct electrical stimulation of a rat hippocampus. The sensors according to example embodiments exhibit a highly linear decoded-output response without hysteresis, even under high ambient water pressure. Compared with the conventional piezoresistive (i.e., PEDOT:PSS) tactile sensors, it was shown that the output signal from a system according to an example embodiment does not saturate under high ambient water pressure. Remarkably, the sensing capability of the sensors according to example embodiments is invariant to local ambient water pressure.

Coupled with a Spiking Neural Network (SNN), the sensor according to an example embodiment mounted on a robotic gripper are capable of recognizing objects that are submerged in the water with a high average accuracy of 94.71±1.71%, showing its potential for deep-sea tactile perception. Furthermore, the trained SNN was implemented on a highly energy-efficient neuromorphic hardware, i.e., the Intel Loihi for inference, also yielding a good classification accuracy of 93.58%. Next, a sensor array (made of the sensors according to example embodiments) was encoded with unique pulse signatures and a Convolution Neural Network (CNN) was implemented for sensor identification. Importantly, the sensor array was functionalized (that is synergized with the CNN) as a controller in playing the Tetris video game, demonstrating the applicability of the sensors according to example embodiments for artificial intelligence applications. The voltage pulses evoked by the self-spiking sensor according to an example embodiment were shown to be compatible with the electrical stimulation of the rat hippocampus; the resulting responses recorded from a rat hippocampal slice were similar with the ones induced by a commercial isolated pulse stimulator.

Embodiments of the present invention can be useful as a new platform for emerging neuromorphic sensors, underwater tactile perception, intelligent robotic tactile sensing, neurorobotics, and human-machine interfaces.

Transduction Principle of the Neuromorphic Sensing System (Sensor) According to an Example Embodiment FIG. 1(A) shows an illustration of the transduction principle according to an example embodiment. Upon sensing the external pressure stimuli 100, the micro-magnets 102 are displaced through the helical coils e.g. 104, and the rate of change of magnetic flux through the coils e.g. 104 evokes the voltage pulses 106. FIG. 1(B) shows the representative evoked voltage pulse of the micro-magnets flowing through a helical coil. The evoked pulse is the superposition of the induced voltage pulse of every circular wire loop of the helical coil. The lines and data points represent simulation and experimental results, respectively.

A self-powered spike-based pressure sensing strategy with magnetic materials is employed in an example embodiment that captures and transmits mechanical sensory information as a combinatorial sequence of electrical pulses. As opposed to current methods using complex electronic circuitry and software, a design according to an example embodiment uses the Faraday's law of electromagnetic induction to produce an electromotive force in the form of an electrical pulse as magnetic field sources are passed through a helical coil (see FIG. 1(A)). Magnetic materials have been the focus of current research in the areas of soft robotics, actuators, and sensors. Yet, these materials remain underexplored for underwater pressure sensing. Advantageously, the sensing strategy with magnetic materials according to an example embodiment can enable sensing under high ambient water pressure, unlike piezocapacitive- and piezoresistive-thin-film sensors with output signals that saturate in response to high ambient pressure conditions.

In the spike-based sensing strategy according to an example embodiment, the magnetic field sources are important because they transduce the sensed pressure into voltage pulses. Magnetization of the magnetic field sources plays an important role in determining the amplitude of the voltage pulses and the signal-to-noise ratio. In an example embodiment Neodymium-Iron-Boron (NdFeB) powder with high remanence and coercivity was used to produce the transducing units (i.e., micro-magnets). The drop break-off technique was modified to fabricate the micro-magnets (as will be described in more detail below), which are made from NdFeB powder and polydimethylsiloxane (PDMS). This technique yielded spherical micro-magnets that have a magnetization less than 143 emu/cm$^3$ measured using a vibrating sample magnetometer (Model 7407, Lake Shore Cryotronics). In a preferred example embodiment, another casting method (as will be described in more detail below) was employed using the same ingredients to produce cylindrical micro-magnets with a magnetization of up to 300 emu/cm$^3$, see FIGS. 2(A) and (B). FIG. 2(A) shows the remanence of the micro-magnets with various magnetic concentrations measured using a vibrating sample magnetometer. FIG. 2(B) shows the hysteresis loop of the micro-magnets with NdFeB powder of 23 v./v. %.

It is noted that the micro-magnets fabricated by these two techniques can be employed interchangeably. It was found that the micro-magnets can swell in the presence of organic solvents. Hence, a perfluoropolyether oil (GPL101, Krytox) is used in preferred example embodiments, which is a low-viscosity fluid with high thermal stability as the liquid carrier to displace the micro-magnets through the helical coils.

Figures 3A, 3B, 3C, 3D:
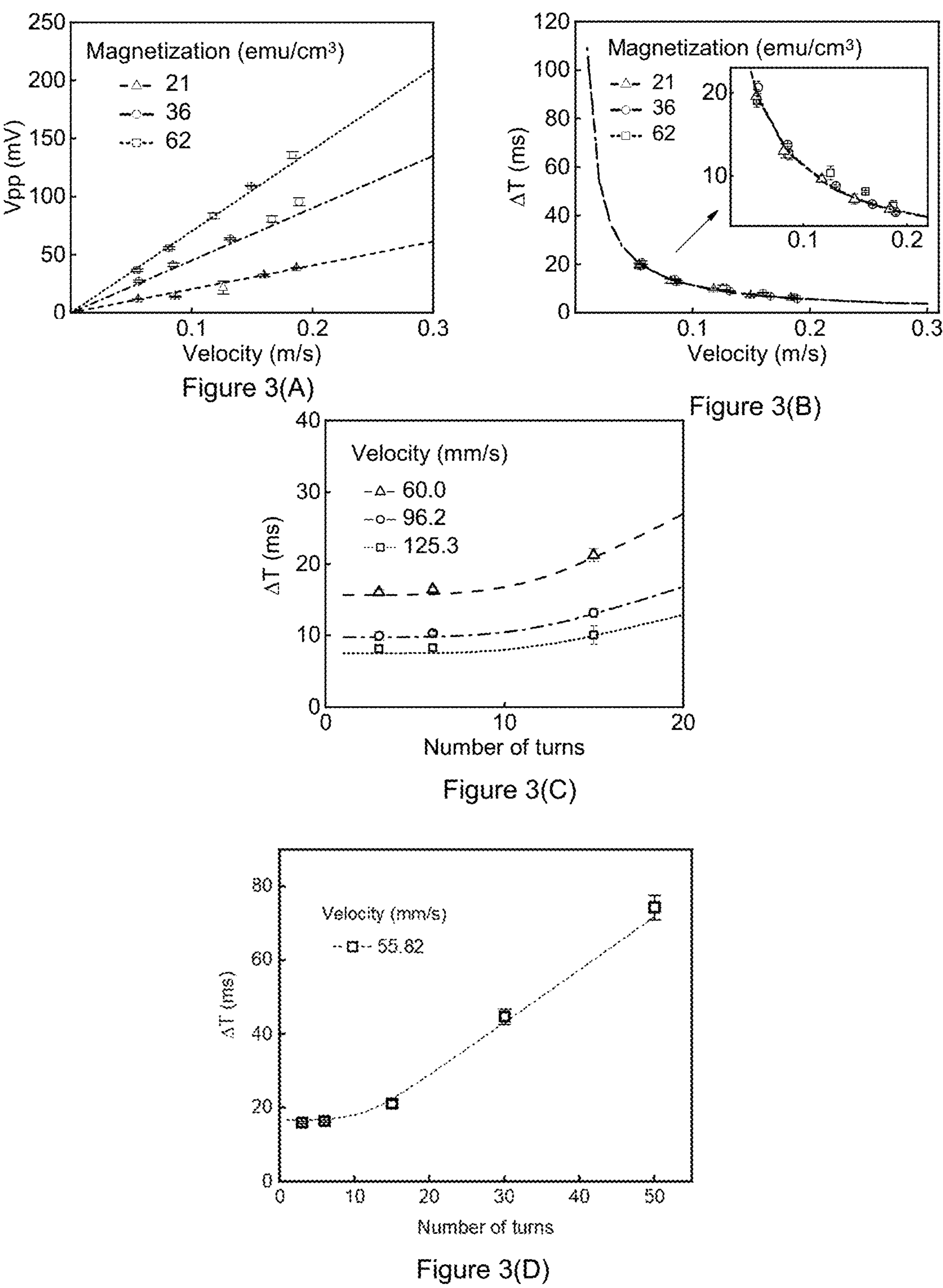
FIG. 3(A) shows the peak-to-peak voltage ($V_{pp}$) of the evoked pulse with different moving velocities of the micro-magnets (with different magnetizations) displacing through a helical coil of 12 turns, according to example embodiments.
FIG. 3(B) shows the time ($\Delta T$) of the evoked pulse with different moving velocities of the micro-magnets (with different magnetizations) displacing through a helical coil of 12 turns, according to example embodiments.
FIG. 3(C) shows a representative scalability plot of the width of the voltage pulse (represented by $\Delta T$) versus the number of turns of a helical coil with the micro-magnets moving at different velocities, according to example embodiments.
FIG. 3(D) shows a representative scalability plot of the width of the voltage pulse (represented by $\Delta T$) versus the number of turns of a helical coil with the micro-magnets moving at a velocity of 55.82 mm/s, according to an example embodiment.

FIGS. 3(A) and (B) show peak-to-peak voltage ($V_{pp}$) and time ($\Delta T$), respectively, of the evoked pulse with different moving velocities of the micro-magnets (with different magnetizations) displacing through a helical coil of 12 turns, according to example embodiments. FIG. 3(C) shows a representative scalability plot of the width of the voltage pulse (represented by $\Delta T$) versus the number of turns of a helical coil with the micro-magnets moving at different velocities, according to example embodiments. The number of turns of the helical coil affects the width of the voltage pulse(represented by $\Delta T$) considerably: lesser number of turns (see also FIG. 3(D)) evokes a shorter response time of the sensor according to example embodiments.

To establish the repeatability of the evoked voltage pulses, at least two micro-magnets were utilized in an example embodiment. This configuration advantageously maintains the magnetic pole orientation of the micro-magnets while they are displacing through the helical coils, thereby ensuring consistency in the rate of change of magnetic flux. In fact, based on the Faraday's law of electromagnetic induction, such configuration maximizes the efficiency of the micro-magnets in evoking the voltage pulses. It is noted that in the case of cylindrical micro-magnets, the magnetic pole orientation of the micro-magnets while they are displacing through the helical coils may be maintained even is one micro-magnet is used in an example embodiment. To better understand this transduction principle according to an example embodiment, an analytical model was derived to predict the evoked pulses. This model was validated by flowing two micro-magnets of various magnetizations (i.e., 21 to 62 emu/cm$^3$) at different velocities (i.e., 55 to 187 mm/s) through a helical coil of 12 turns. As predicted, the peak-to-peak voltage ($V_{pp}$) of the voltage pulses exhibited a highly linear response (see FIG. 3(A)). It was observed that the peak-to-peak time ($\Delta T$) of the pulses are invariant to the magnetization of the micro-magnets (see FIG. 3(B)). However, they decay exponentially with respect to the moving velocity of micro-magnets. It was found that the number of turns of the helical coil also affects the width of the pulse (represented by $\Delta T$) considerably: Lesser number of turns (see FIGS. 3(C) and (D)) evokes shorter response time.

Figures 4, 5A, 5B:
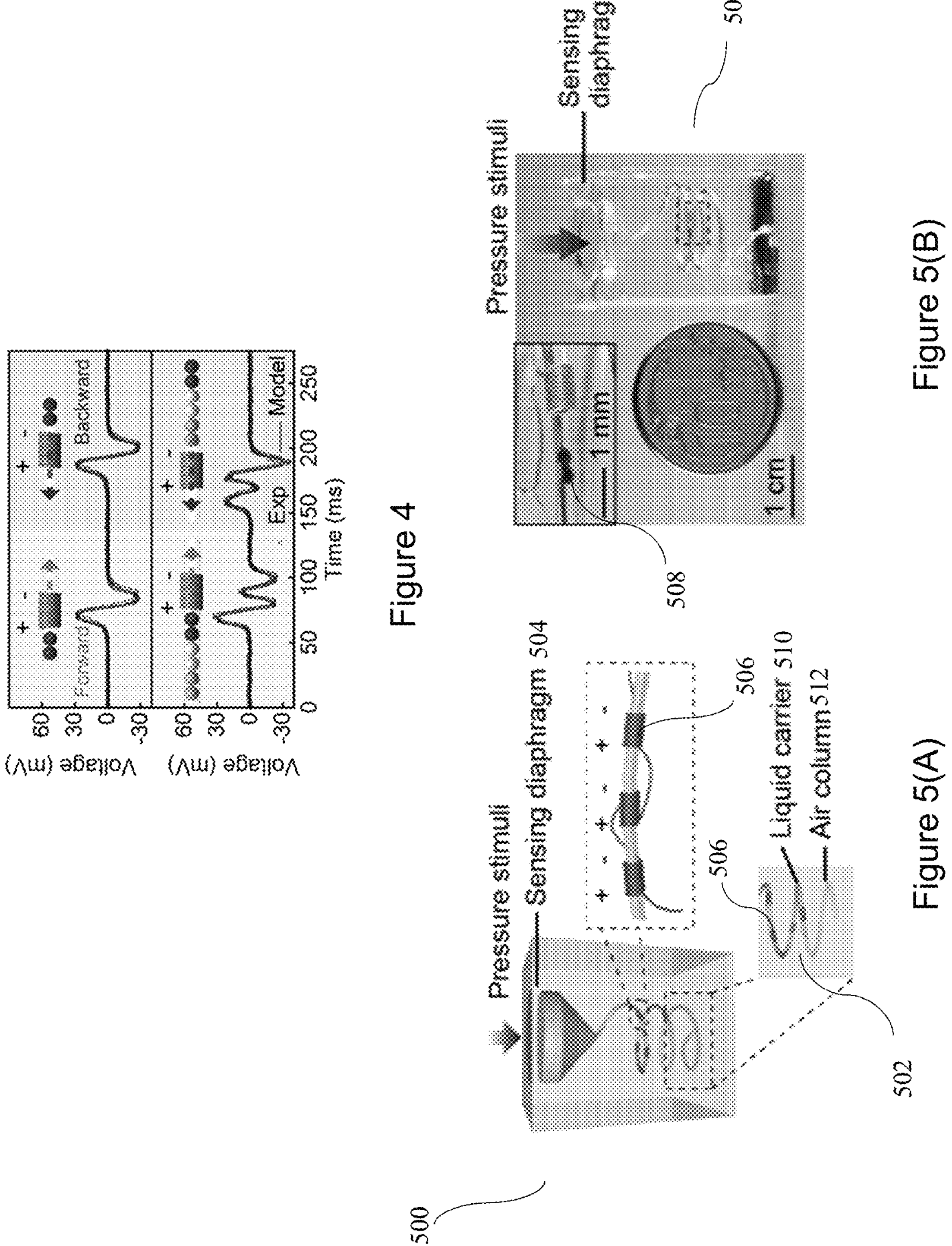
FIG. 4 shows graphs illustrating unique pulse signatures according to example embodiments.
FIG. 5(A) shows an illustration of a sensor according to an example embodiment.
FIG. 5(B) shows a photograph of a sensor according to an example embodiment.

An advantage of the transduction principle according to an example embodiment is the ability to encode unique pulse signatures. This feature was achieved by utilizing multiple micro-magnets with different magnetizations as the magnetic field sources. For example, by using an asymmetrical arrangement of micro-magnets as the magnetic field sources, the evoked pulse signature is unique from the symmetrical counterpart. FIG. 4 shows graphs illustrating unique pulse signatures according to an example embodiment: Symmetrical (62-62 emu/cm3) (top) and asymmetrical (62-62-21-21-36-36 emu/cm3) (bottom) arrangements of the micro-magnets. The unique pulse signature is the resultant superposition of the pulses evoked by the individual micro-magnets displacing through the helical coil. The moving direction of the magnetic field sources changes the polarity of the evoked signature, i.e., a positive/negative pulse signature is evoked when the asymmetrical arrangement of micro-magnets is displaced forward/backward through a helical coil, respectively. However, this effect is not observed with a symmetrical arrangement of micro-magnets since the evoked signature is invariant to the inversion of its polarity.

Design and Performance of the Sensor According to an Example Embodiment

FIGS. 5(A) and (B) show an illustration and a photograph of the sensor 500 according to an example embodiment; a microfluidic channel 502 integrated with a pressure-sensing diaphragm 504, a serially-connected array of helical coils e.g. 506, and micro-magnets e.g. 508. In FIG. 5(B), the sensor 500 is compared to a Singapore 10-cent coin.

Based on the transduction principle according to an example embodiment, the fabricated sensor 500 (FIG. 5) captures and propagates pressure stimuli information as a combinatorial sequence of voltage pulses. The sensor 500 is composed of the pressure-sensing diaphragm 504, a serially-connected array of helical coils e.g. 506, and the micro-magnets e.g. 508. When a pressure stimulus is exerted on the sensing diaphragm 504, the liquid 510 carrying the micro-magnets would be displaced along the microfluidic channel 502. This evokes a combinatorial sequence of voltage pulses as the micro-magnets e.g. 508 are displaced through the helical coils e.g. 506, and the air column 512 sealed at the end of the microfluidic channel is compressed. Upon releasing the applied pressure stimulus, the compressed air will expand and return the sensor 500 to its original state. For the liquid carrier 510 inorganic solvents may be used, with low viscosity and preferably compatible with PDMS, in different example embodiments.

However, the liquid carrier 510 is not limited to inorganic liquid, but can e.g. be perfluorinated organic solvents, for example, GPL101, Krytox in different example embodiments.

Encoding Scheme of the Sensor According to an Example Embodiment

Figures 6A, 6B, 7:
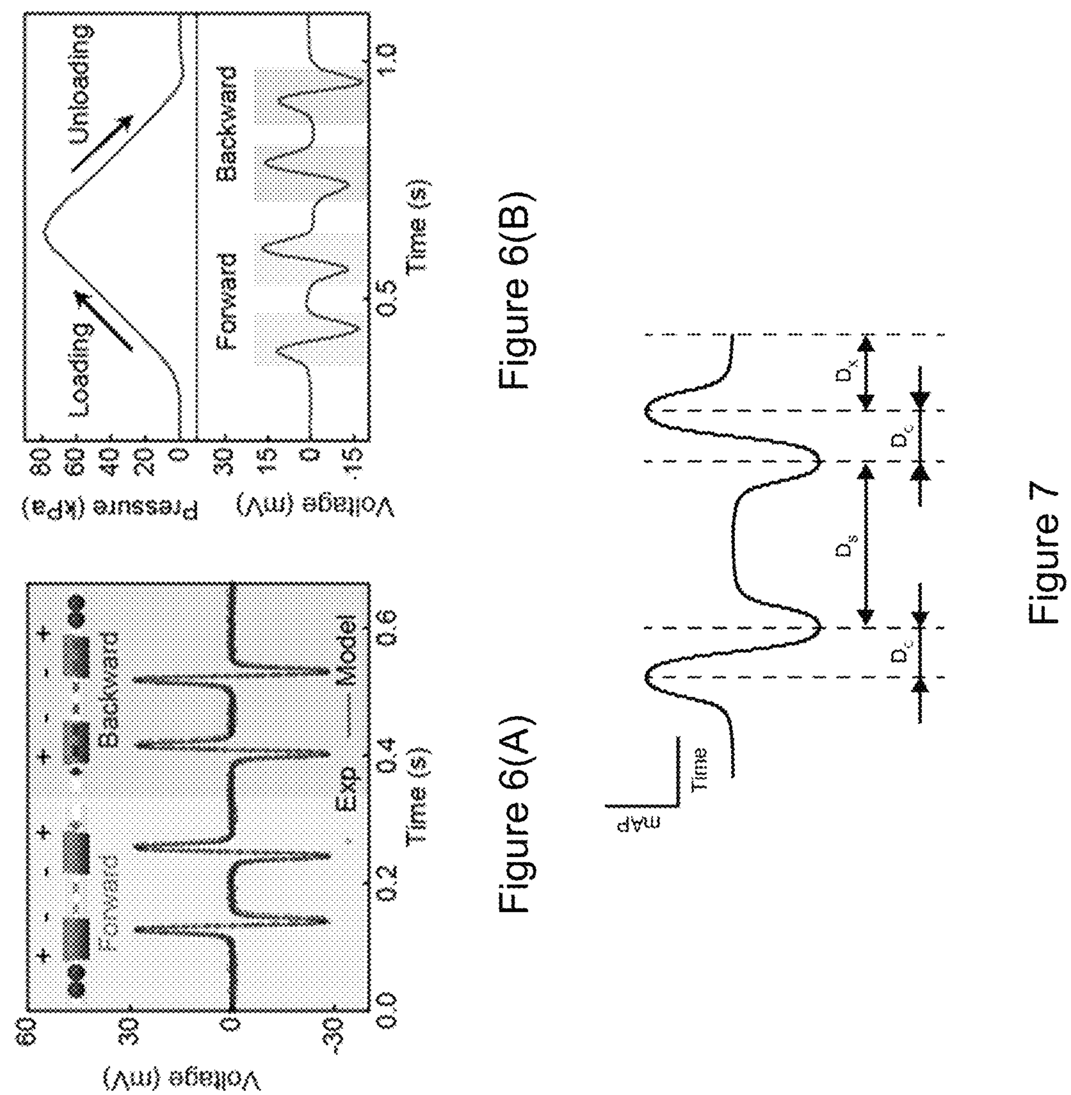
FIG. 6(A) shows a unique encoding scheme of the sensor according to an example embodiment.
FIG. 6(B) shows the pressure sensing principle according to an example embodiment.
FIG. 7 shows a graph illustrating the travelled distance of the micro-magnets between evoked pulses, according to an example embodiment.

The sensing principle of the sensor according to an example embodiment entails a unique encoding scheme (see FIG. 6(A)); when the magnetic field sources traverse through the helical coils, the polarity ($P_L$) of the evoked voltage pulse changes according to the index of the helical coil, as described by $$P_L = (-1)^{(n-1)} \tag{1}$$

where n is the index of the helical coil.

The polarity ($P_L$) of an evoked pulse (see FIG. 6(B)) is determined by the amplitude ($A_p$) of the first peak of the electrical signal, which is described by:

$$P_L = \begin{cases} +1, & A_p \geq 0 \\ -1, & \text{otherwise} \end{cases}. \tag{2}$$

FIG. 6(A) shows a unique encoding scheme of the sensor according to an example embodiment that transduces pressure stimuli into a combinatorial sequence of voltage pulses: an increase (left)/decrease (right) in pressure displaces the micro-magnets forward/backward through the helical coils, respectively. The line represents the simulation results. FIG. 6(B) shows the pressure sensing principle according to an example embodiment: A combinatorial sequence of voltage pulses that encodes the stimulus information; applied pressure (top) and its corresponding evoked pulses (bottom).

This encoding scheme allows to track both the moving-direction and the position of the magnetic field sources in the sensor according to an example embodiment. The position of the micro-magnets (in the sensor) is tracked by alternating the PL of the evoked pulses as the micro-magnets traverse forward/backward through the helical coils. It is noted that when the traversing direction of the micro-magnets changes, the subsequent evoked pulse would possess the same $P_L$ with the one induced previously (FIG. 6(A)). This encoding scheme is made possible by serially connecting the terminals of the helical coils e.g. 506 with the same polarity together (compare FIG. 5*a*, inset). The spacing between the helical coils was optimized such that the evoked pulses were not superimposed. It is noted that for FIG. 5*a*, it was tried to accurately show the wirings of the helical coils, that is, how the terminals of the coils are serially connected with same polarity together. For FIG. 6*a*, the wirings are not shown and therefore just the correct "+" and "–" sequence is depicted.

Returning to FIGS. 5(*a*) and (B). the sensor 500 according to an example embodiment was fabricated using standard microfluidic technology. When a pressure stimulus is sensed by the sensor 500, the micro-magnets e.g. 508 traverse through the helical coils e.g. 506 and evoke voltage pulses. The increase/decrease of the amplitude of the sensed pressure stimulus results in the micro-magnets to traverse forward/backward through the helical coils, respectively. The distance travelled by the micro-magnets (in the sensor) contains information regarding the amplitude of the sensed pressure stimulus, which is encoded as a combinatorial sequence of pulses.

Decoding Scheme of the Sensor According to an Example Embodiment

The performance of the sensor according to an example embodiment was characterized by applying and removing a vertical load on the pressure-sensing diaphragm. The combinatorial sequences of voltage pulses were decoded to retrieve the travelled distances of the micro-magnets. The decoded results were correlated with the amplitude of the applied pressure stimuli.

The number of helical coils (h) that the micro-magnets have traversed forward through were first determined by tracking the alternating $P_L$ of the evoked pulses. Next, the distance travelled (D) by the micro-magnets (in the sensor), which is due to the applied pressure stimulus was approximated by:

$$D = hD_c + (h-1)D_s + D_x \tag{3}$$

where $D_c$ is the travelled distance of the micro-magnets between the peak-to-peak time of an evoked pulse (see FIG. 7), $D_s$ is the travelled distance of the micro-magnets between the evoked pulses, and $D_x$ is the estimated travelled distance of the micro-magnets between the last evoked pulse and the position where the micro-magnets have stopped moving (before changing their moving direction to return to the initial position). Note that $D_c$ and $D_s$ are invariant to the moving velocity of the micro-magnets and their values were derived from the proposed analytical model for predicting the pulses.

The $D_x$ was estimated by:

$$D_x = \frac{\Delta T_x}{2} V_q = \frac{\Delta T_x}{2} \frac{D_c}{\Delta T_c} \tag{4}$$

where $V_q$ is the moving velocity of the micro-magnets traversing through the sensor before stopping (and changing their moving direction to return to the initial position), $\Delta T_c$ is the peak-to-peak time of the last evoked pulse (before the micro-magnets change their moving direction to return to the initial position), and $\Delta T_x$ is the time-interval between the two evoked pulses that possess the same $P_L$. Specifically, there are four evoked pulses in total in FIG. 6(A). The second and third pulses (i.e., the middle two pulses) possess the same $P_L$ in FIG. 6(A), indicating a change of moving direction (from forward to backward). The $D_x$ was estimated under the assumption that the micro-magnets changed their moving direction immediately upon releasing the applied pressure stimulus. The decoding scheme was scripted in MATLAB.

Performance of the Sensor According to an Example Embodiment

Figures 8A, 8B, 8C, 8D, 8E:
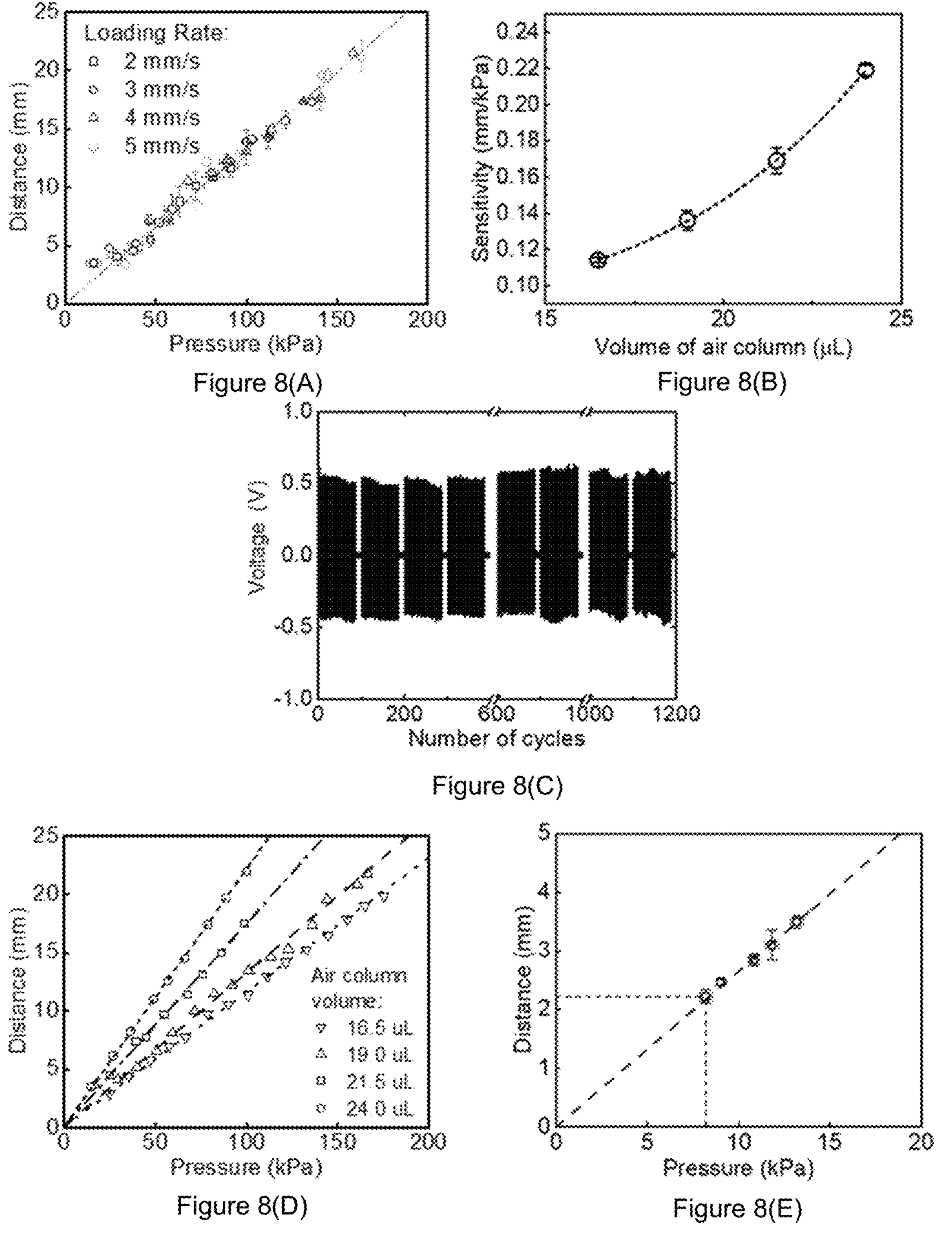
FIG. 8(A) shows the decoded travelled distance of the micro-magnets (in the sensor according to an example embodiment) in response to an increasing applied pressure amplitude (i.e., from 17 to 166 kPa) to the sensing diaphragm, with an air column of 19 $mm^3$.
FIG. 8(B) illustrates the tunable sensitivity of the sensor via controlling the volume of the air column, according to an example embodiment.
FIG. 8(C) illustrates the stability of the sensor under a cyclic test of 1200 cycles, according to an example embodiment.
FIG. 8(D) illustrates the tunable sensitivity of the sensor via controlling the volume of air column, according to an example embodiment.
FIG. 8(E) illustrates the volume of the air column being optimized in a sensor according to a preferred example embodiment and achieving a low detection limit of 8.37 kPa.

The output signal of the sensor according to an example embodiment was decoded to retrieve the travelled distance of the magnetic field sources to correlate with the applied pressure amplitude. FIG. 8(A) shows the decoded travelled distance of the micro-magnets (in the sensor according to an example embodiment) in response to an increasing applied pressure amplitude (i.e., from 17 to 166 kPa) to the sensing diaphragm, with an air column of 19 $mm^3$. The decoded results exhibit a highly linear response (coefficient of determination, $R^2$=0.997). Advantageously, they are invariant to the loading rate of the applied pressure stimulus. Such a linear-transfer characteristic of the sensor according to an example embodiment allows a simple linear equation to be established for accurate mapping of the decoded results to the applied pressure amplitude.

Next, the sensitivity of the sensor according to an example embodiment was studied by varying the volume of the air column (sealed at the end of the microfluidic channel 502, FIG. 5) in the range of 16.5 to 24 $mm^3$. The sensitivity (S) of the sensor was quantified as:

$$S = \frac{dD}{dP} \qquad (5)$$

where D is the travelled distance of the magnetic field sources, and P is the applied pressure amplitude.

FIGS. 8(B) and (D) illustrate the tunable sensitivity of the sensor via controlling the volume of air column. FIG. 8(C) illustrates the stability of the sensor under a cyclic test of 1200 cycles. The dashed lines in FIGS. 8(A) and (B) are regression fits and error bars represent the standard deviation over three measurements.

The study revealed that the sensitivity of the sensor according to example embodiments increases monotonically with respect to the volume of air column (FIG. 8(B)). The volume of air column was optimized in a sensor according to a preferred example embodiment and achieved a low detection limit of 8.37 kPa (see FIG. 8(E)). To demonstrate the stability of the sensor according to the preferred example embodiment, a cyclic test was performed by applying a constant pressure stimulus of 12.7 kPa for 1200 cycles (FIG. 8(C)).

Different Form Factor of the Sensor According to an Example Embodiment

Figures 9, 10A, 10B:
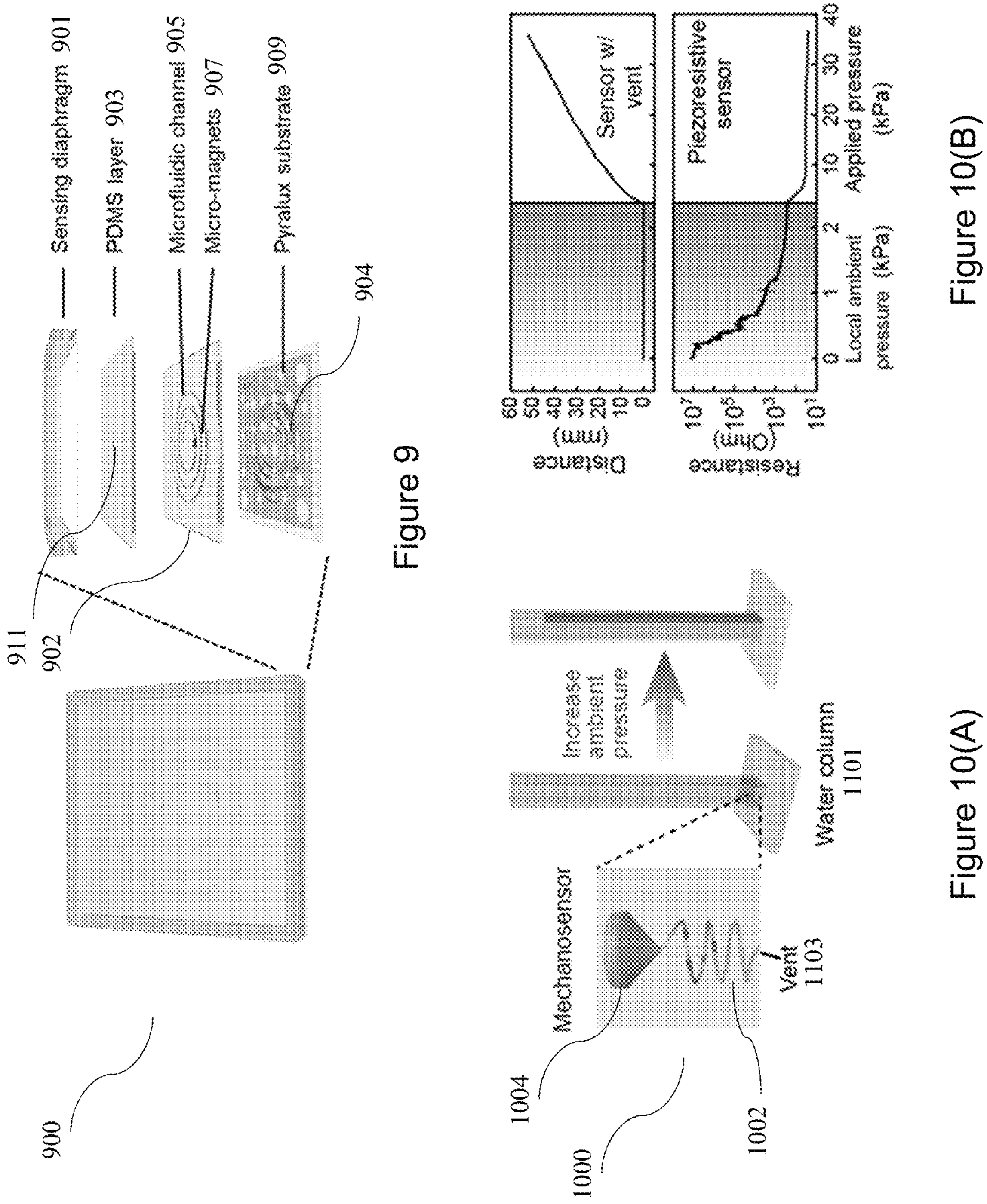
FIG. 9 shows an illustration of a flexible sensor with thin form factor, according to an example embodiment.
FIG. 10(A) shows a schematic of the setup for underwater pressure sensing according to an example embodiment.
FIG. 10(B) shows the outputs generated from the sensor of FIG. 10(A) (top) and a PEDOT:PSS sensor for comparison (bottom).

FIG. 9 shows an illustration of a flexible sensor 900 with thin form factor, according to an example embodiment. The sensor 900 is composed of a pressure-sensing diaphragm 901, a PDMS-layer 903, a PDMS-layer 902 with a spiral microfluidic channel 905 and micro-magnets 907, and a Pyralux substrate 909 with conductive traces e.g. 904. The PDMS layer 903 has an opening 911 aligned with the central end of the spiral microfluidic channel 905, for fluid communication between the reservoir underneath the pressure-sensing diaphragm 901 and the spiral microfluidic channel 905, in an assembled state of the sensor 900.

This demonstrates that, advantageously, due to the sensing principle of the sensor according to example embodiments and the microfluidic technology, the performance and the physical form factor of the sensor can be customized to suit different applications.

Applications of the Sensors According to an Example Embodiment

Ambient Pressure-Invariant Tactile Sensing

FIG. 10(A) shows a schematic of the setup for underwater pressure sensing according to an example embodiment, where the sensor 1000 according to an example embodiment is positioned at the bottom of a water column 1001 of 1.7 m height. The ambient pressure on the sensor 1000 is controlled by increasing the amount of water in the column 1001. The enlarged inset shows the location of a vent 1003 on the sensor 1000. FIG. 10(B) shows the outputs generated from the sensor 1000 (top) and a PEDOT:PSS sensor for comparison (bottom). In each the top and the bottom graphs, on the left: The sensors are subjected to different ambient pressures. On the right: External pressures are applied on the sensors while submerged under water with an ambient pressure of 2.42 kPa. It is noted that in this embodiment, there is no "gas" in the sensor. The vent allows the water to enter into the microfluidic channel 1002. In such an embodiment, ambient water pressure is directed through the vent 1003 to the rear of the sensing diaphragm 1004, via the carrier liquid (i.e., water).

Advantageously, the sensor 1000 can be applied for ambient pressure-invariant tactile sensing by creating the vent 1003 at the end of the microfluidic channel 1002 of the sensor (FIG. 10(A)). In such a device, ambient water pressure is directed through the vent 1003 and the microfluidic channel 1002 to the rear of the sensing diaphragm 1004 and hence, the underwater tactile sensor according to an example embodiment measures the pressure relative to the local ambient water pressure. The sensor 1000 was attached at the bottom of the water column 1001 of 1.7 m-height, and the ambient pressure on the sensor was controlled by increasing the amount of water in the column. First, the sensor 1000 is subjected to different ambient pressures by filling up the water column 1001. Next, external pressures were applied on the sensor via a 1.8 m-long indenter by hand.

The results show that the sensor 1000 does not get affected by the local ambient pressure (see FIG. 10(B), upper graph). Advantageously, it was found that the sensor 1000 maintains its highly linear decoded-output response despite being completely submerged under water. In contrast, this is not the case for a conventional piezoresistive tactile sensor (for e.g., PEDOT:PSS), whereby its output signal saturates in response to an increasing ambient pressure, limiting its operating range and utility in underwater tactile sensing (see FIG. 10(B), lower graph).

Figure 11B:
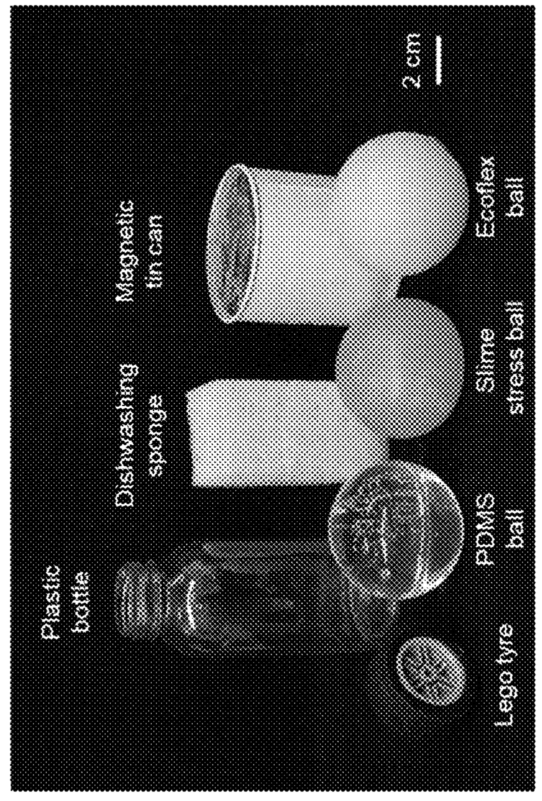
FIG. 11(B) shows the photograph of all the objects used in the recognition task, using the system of FIG. 11(A).
Figure 11A:
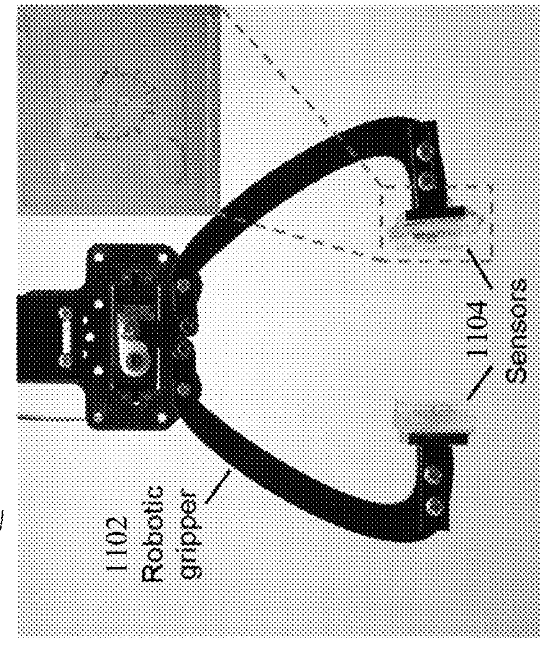
FIG. 11(A) shows a photograph of an underwater object recognition system according to an example embodiment.

FIG. 11(A) shows a photograph of an underwater object recognition system 1100 according to an example embodiment using a robotic gripper 1102 equipped with the sensors 1104 according to example embodiments. The outputs from the sensors induced by grasping the objects can be transferred to a neuromorphic hardware for inference. FIG. 11(B) shows the average confusion matrix of the underwater object recognition task derived from Spiking Neural Network (SNN).

Figure 11C:
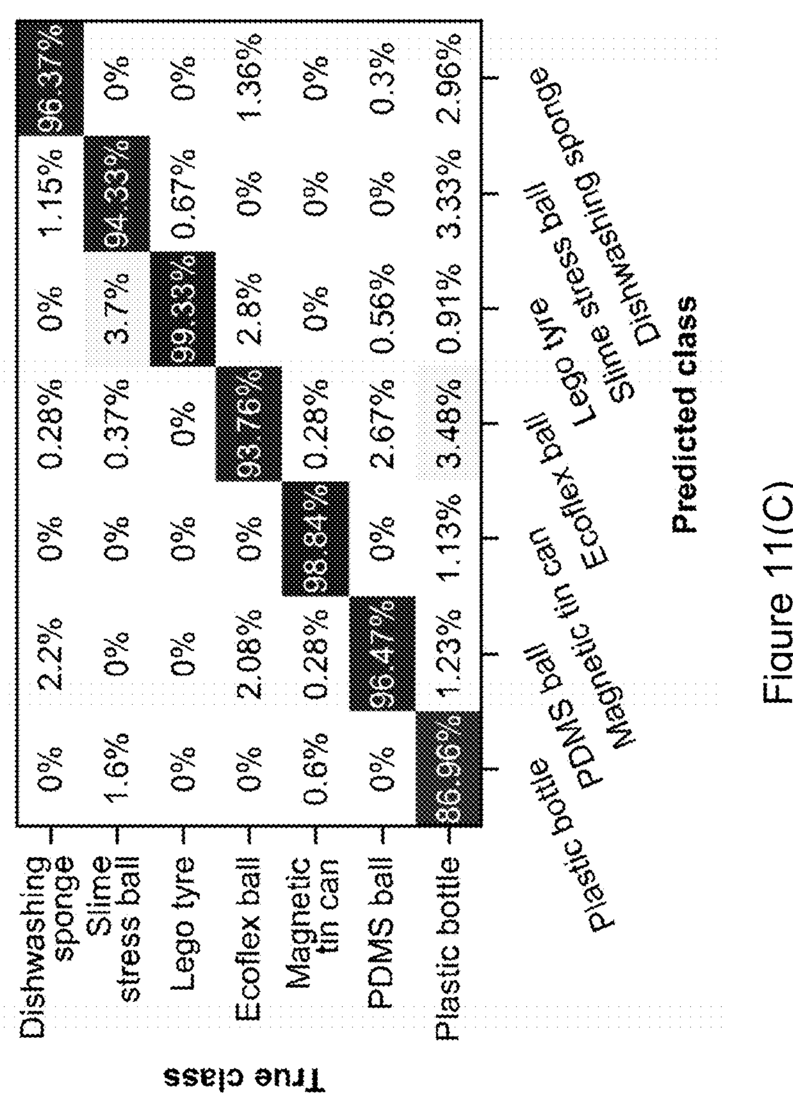
FIG. 11(C) illustrates that with a single grasping action, the SNN using a local GPU was capable of classifying the grasped object with a high average accuracy of 94.71±1.71%, according to an example embodiment.

A common need in underwater and deep-sea robotic applications requires grasping and recognition of objects. Coupled with machine learning, sensors according to example embodiments (that have a thin form factor with a vent) are integrated onto the robotic gripper for an underwater object recognition task (see FIG. 11(A)). An object database was constructed by physically grasping seven different objects (see FIG. 11(B) in the water and then performing classification using a Spiking Neural Network (SNN). SNNs closely mimic the biological neural networks and are well-suited for processing spike-based sensor output according to an example embodiment. With a single grasping action, the SNN using a local GPU was capable of classifying the grasped object with a high average accuracy of 94.71±1.71% (see FIG. 11(C)). This demonstrates the potential use of the sensors according to example embodiments for deep-sea tactile perception in grasping tasks without vision. Furthermore, the trained SNN was implemented on a highly energy-efficient neuromorphic hardware, i.e., the Intel Loihi for inference, also yielding a good classification accuracy of 93.58%.

Smart Sensing With Machine Learning According to an Example Embodiment

Figure 12A:
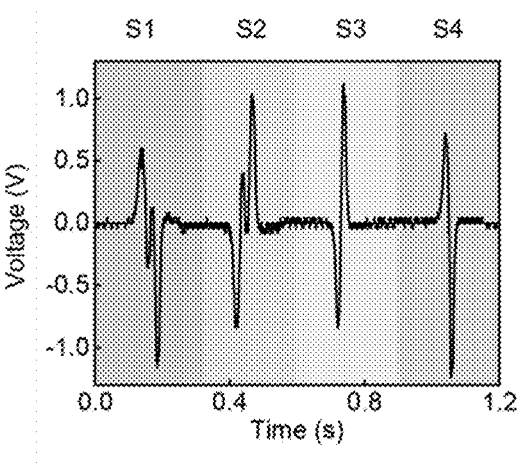
FIG. 12(A) shows examples of the unique pulse signatures evoked by the four different sensors according to example embodiments.
Figure 12B:
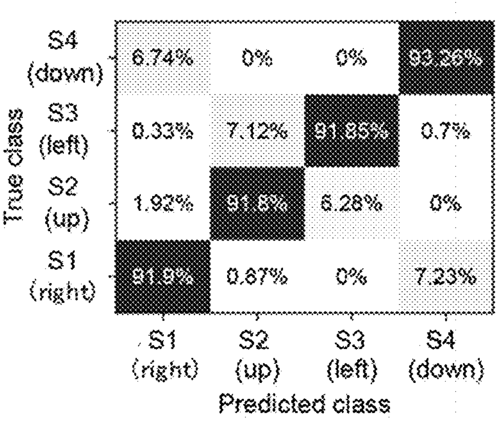
FIG. 12(B) shows the average confusion matrix of the sensor identification task derived from Convolutional Neural Network (CNN), according to an example embodiment.

FIG. 12(A) shows examples of the corresponding unique pulse signatures evoked by the four different sensors according to example embodiments (i.e., S1, S2, S3, and S4). FIG. 12(B) shows the average confusion matrix of the sensor identification task derived from Convolutional Neural Network (CNN).

Machine learning has emerged as a key approach for feature extraction to reduce large sensory data to be informative and non-redundant. To simplify the decoding of the output signals evoked by multiple sensors according to example embodiment (encoded with unique pulse signatures, e.g. S1, S2, S3, and S4) for sensor identification, a Convolutional Neural Network (CNN) was implemented that can learn the unique pulse signatures. A dataset was constructed with four sensors according to example embodiments, with each sensor generating a unique signature (see FIG. 12(A)). The data were collected by manually pressing on the individual sensors by hand. The choice of manual pressing by hand is to ensure that the applied stimuli are varied within and between trials to achieve realistic stimulus conditions. This substantially increased the problem complexity because of the variability in the applied stimuli which is due to the unconstrained human gestures. Next, a CNN was trained with the dataset for sensor identification. it was observed that the CNN is capable of discriminating the output signals evoked by the sensors according to example embodiments, with an average accuracy of 92.19±1.42% (see FIG. 12(B)).

Figure 13:
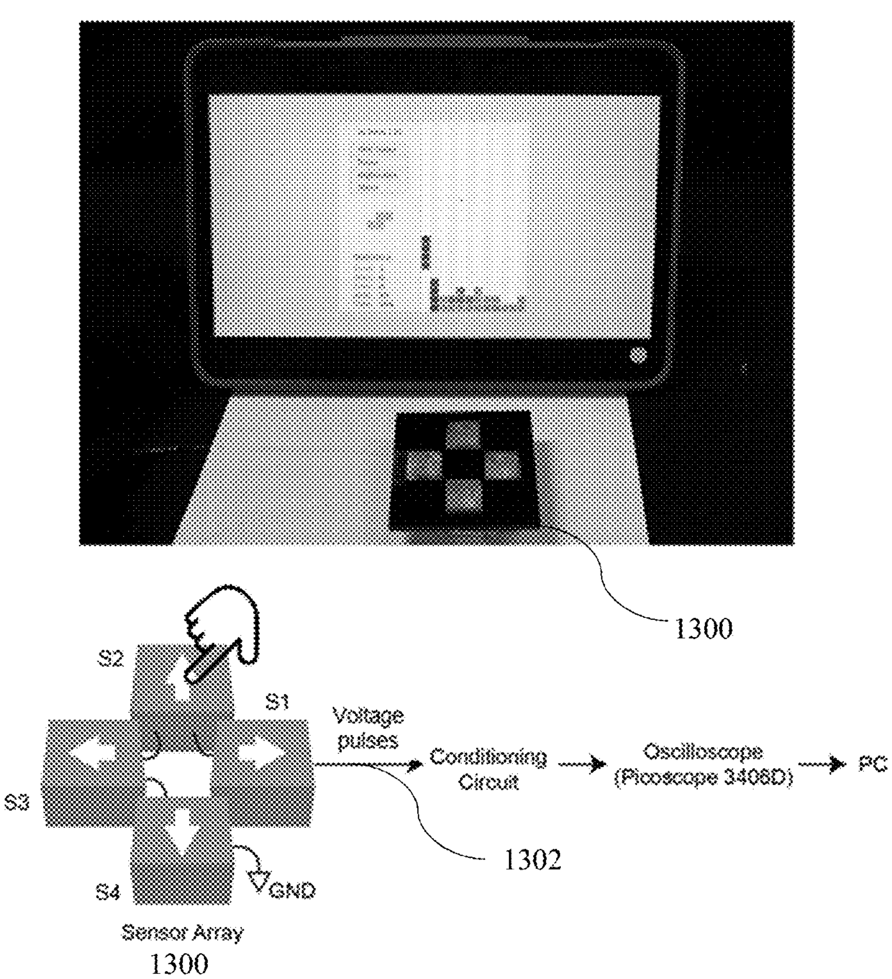
FIG. 13 shows a demonstration (top) and schematic diagram (bottom) of the Tetris video game, played by pressing a two-by-two sensor array according to an example embodiment.

FIG. 13 shows a demonstration (top) and schematic diagram (bottom) of the Tetris video game, played by pressing a two-by-two sensor array 1300 according to an example embodiment, made of the sensors S1-S4 according to an example embodiment. Each sensor corresponds to a moving direction. The four sensors were simply connected in series to form the sensor array, and the wirings were greatly simplified into a single electrical conductor 1300 for signal propagation.

Electrical Stimulation of a Rat Hippocampus According to an Example Embodiment

Figure 14B:
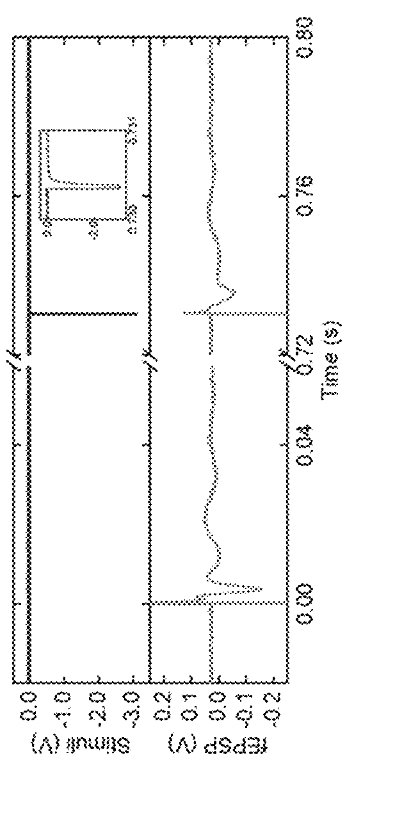
FIG. 14(B) shows at top: Electrical stimulus produced by the sensor according to an example embodiment, at bottom: Recorded field excitatory postsynaptic potentials (fEPSPs) from the hippocampal slice which are stimulated by a commercial electrophysiology setup.
Figure 14A:
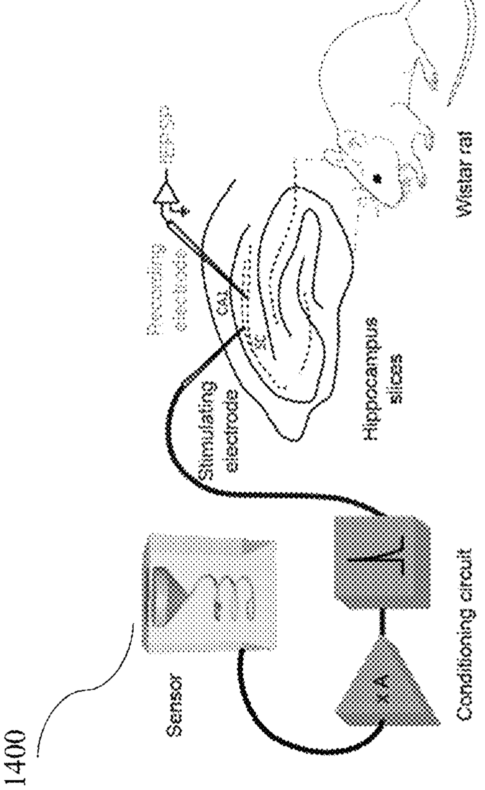
FIG. 14(A) shows a schematic of the setup for the electrical stimulation of a rat hippocampal slice using the voltage pulse evoked by a sensor according to an example embodiment.

FIG. 14(A) shows a schematic of the setup for the electrical stimulation of a rat hippocampal slice using the voltage pulse evoked by a sensor 1400 according to an example embodiment. FIG. 14(B), top: Electrical stimulus produced by the sensor 1400. Bottom: Recorded field excitatory postsynaptic potentials (fEPSPs) from the hippocampal slice which are stimulated by a commercial electrophysiology setup (left, while there is no stimulus spike generated by the sensor 1400) and by the sensor 1400 (right), respectively.

The potential of the self-spiking sensor 1400 according to an example embodiment in facilitating the study of tactile memories was demonstrated by directly encoding tactile stimulus into voltage pulse in rat hippocampal stimulation studies. The tactile-induced pulse evoked by the sensor 1400 was used to directly stimulate a rat hippocampal slice (see FIG. 14(A)). The sensor was engineered to generate a monophasic voltage pulse and its performance is compared with an isolated pulse stimulator (Model 2100, A-M Systems) to determine its applicability for hippocampal stimulation. FIG. 14(B) (bottom) shows the recorded responses from the hippocampal slice, which are stimulated by the isolated pulse stimulator (left) and the sensor 1400, respectively. It is observed that both electrical stimulations exhibited similar responses, thus, affirming the potential of the sensor 1400 according to an example embodiment in stimulating the hippocampus directly with encoded tactile information.

Methods and Materials for Use in Example Embodiments

Materials

Neodymium-iron-boron (NdFeB) (Magnequench), polydimethylsiloxane (PDMS) (Sylgard 184, Dow Corning Midland), pyralux copper clad laminate (Dupont), copper wire (BLOCK), polytetrafluoroethylene (PTFE) teflon tubing (Latech), metal wire (JPNARD TOOLS), polyvinylalchol (PVA) (Sigma-Aldrich), and GPL 101 oil (Chemours) were used as received.

Fabrication of the Spherical Micro-Magnets According to Example Embodiments

Figure 15:
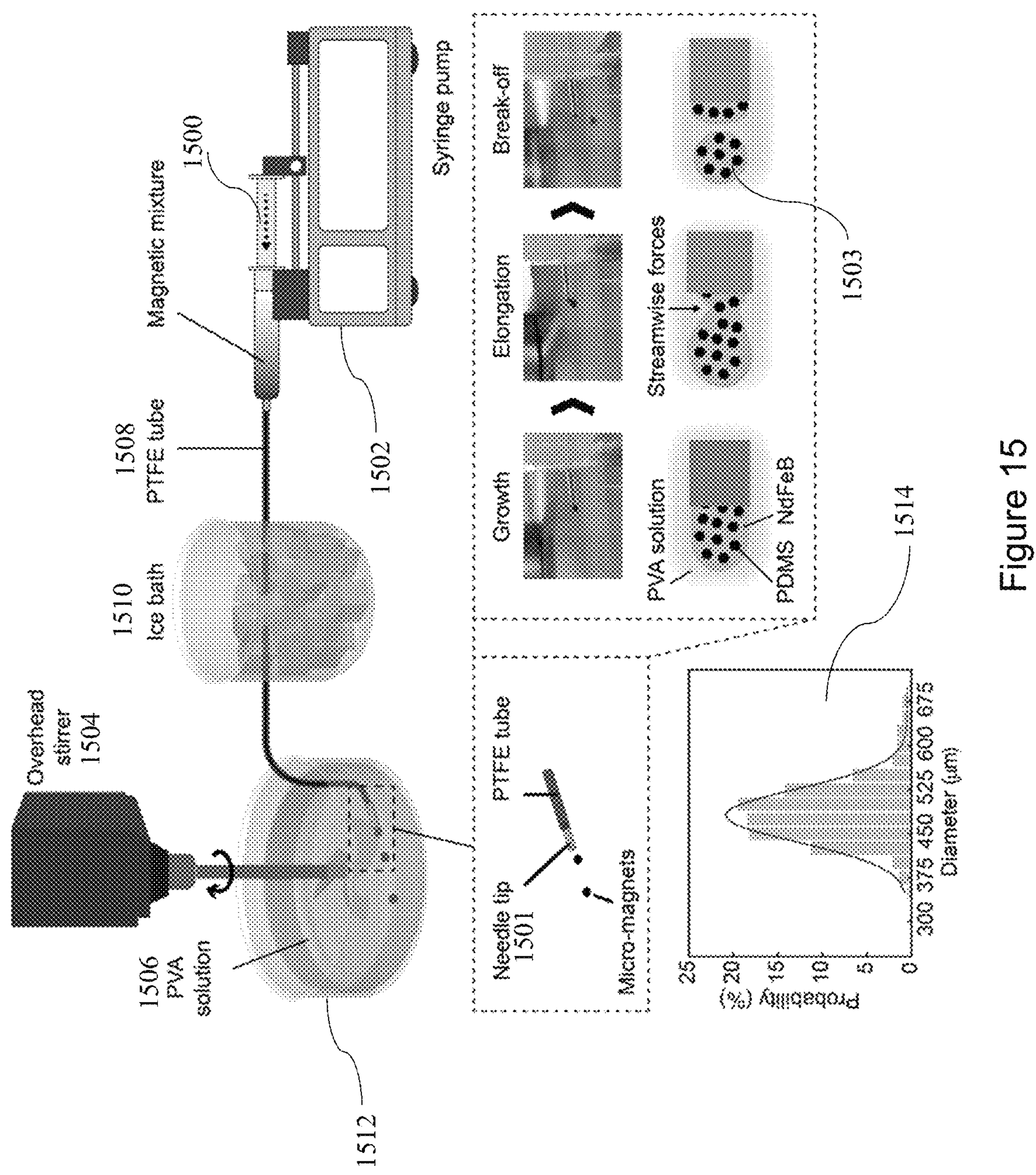
FIG. 15 illustrates the fabrication setup of the spherical micro-magnets according to example embodiments.

The spherical micro-magnets according to example embodiments were fabricated by modifying the droplet break-off technique. Magnetic mixtures with different magnetic concentrations were prepared by centrifugal mixing (2,500 rpm, 150 sec; FlackTek Inc.) of varying ratios of NdFeB powder to PDMS (see Table 1). The NdFeB powder was mixed into the PDMS that had a pre-polymer-to-curing agent ratio of 7:3 (w/w). The magnetic mixture was then degassed in a vacuum chamber for 15 minutes and filled into a luer lock syringe 1500 assembled with a hydrophilic-treated blunt needle 1501, as shown in FIG. 15. Next, the magnetic mixture was injected into a 5 wt % PVA solution at 65° C. by a syringe pump 1502 (Harvard Apparatus) and an overhead stirrer 1504 (IKA) was utilized to break off the stream of magnetic mixture (that is flowing out of the nozzle of the blunt needle 1501) to generate the spherical magnetic droplets e.g. 1503. The droplets were cured in the PVA solution 1506 at 75° C. for 1 hour with stirring at 1000 rpm. Subsequently, the cured droplets were rinsed in deionized water and dried for magnetization by a Vibrating-Sample Magnetometer (VSM) (Lake Shore Cryotronics). The magnetic droplets were magnetized by the VSM at 2 T for 1 minute. Table 2 summarizes the fabrication conditions of the spherical micro-magnets according to example embodiments. The size probability graph 1514 is quantified and plotted from micro-magnets with 23 v./v. % magnetic volume concentration.

TABLE 1

| Micro-magnets | Magnetic volume concentration (v./v. %) | Magnetic weight concentration (wt %) | Weight of NdFeB powder (mg) |
|---|---|---|---|
| Spherical | 1 | 6.61 | 176.93 |
| | 3 | 17.81 | 541.73 |
| | 6 | 30.90 | 1118.04 |
| | 10 | 43.77 | 1946.22 |
| | 14 | 53.28 | 2851.43 |
| | 16 | 57.17 | 3336.37 |
| | 21 | 65.06 | 4656.14 |
| | 23 | 67.67 | 5232.04 |
| Cylindrical | 33 | 77.53 | 8627.26 |
| | 41 | 82.96 | 12172.10 |
| | 47 | 86.14 | 15533.01 |

* Here, the PDMS is weighed 2.5 g, with 1.75 g of pre-polymer and 0.75 g of curing agent.
** Density of the NdFeB powder is 7.61 ± 0.2 g/cm$^3$

TABLE 2

| Magnetic volume concentration (v./v. %) | Needle 1501 size (gauge number) | Inner diameter of PTFE tube 1508 (μm) | Length of PTFE tube 1508 (cm) | Rate of infusion (mL/h) | Rotation speed of overhead stirrer 1504 (rpm) |
|---|---|---|---|---|---|
| 1 | 27G | 300 | 45 | 0.4 | 600 |
| 3 | 27G | 300 | 45 | 0.4 | 600 |
| 6 | 27G | 300 | 45 | 0.4 | 600 |
| 10 | 27G | 300 | 45 | 0.4 | 600 |
| 14 | 27G | 500 | 30 | 1 | 600 |
| 16 | 23G | 500 | 30 | 1 | 1100 |
| 21 | 23G | 500 | 30 | 2 | 1100 |
| 23 | 23G | 500 | 30 | 2 | 1100 |

* Here, the fabricated micro-magnets have a targeted diameter of 500 μm. Note that the fabrication conditions can be adjusted to produce micro-magnets of different diameters.

There are two conditions that were identified for the successful fabrication of the spherical micro-magnets according to a preferred embodiment. First, preferably ensure a steady stream of magnetic mixture is being injected out of the nozzle of the needle 1501. This is warranted by incorporating an ice bath 1510 into the experimental setup to alleviate the frictional heat that is being generated by the magnetic mixture flowing through the PTFE tube 1508. Otherwise, the generated heat would start curing the mixture to cause blockage in the tube 1508. Second, preferably prevent the newly formed spherical magnetic droplets from merging together. This can be ensured by producing the droplets in a surfactant-laden solution (for example, 5 wt % PVA solution) at 65° C. to form stable emulsions and to rapidly cure the droplets. Additionally, the container 1512 that holds the surfactant-laden solution is preferably hydrophilic-treated to further circumvent the droplets from merging together.

Characterization of the Micro-Magnets According to Example Embodiments

The remanence of the micro-magnets for use in example embodiments was measured by the Vibrating-Sample Magnetometer (VSM) (Lake Shore Cryotronics). A sweep of external magnetic field from −2 T to 2 T is applied to the micro-magnets by the VSM, and the residual magnetization at zero field is the remanence of the micro-magnets. The magnetic field emanated by the micro-magnets was quantified by a gauss meter (Hirst Magnetics).

Figure 16:
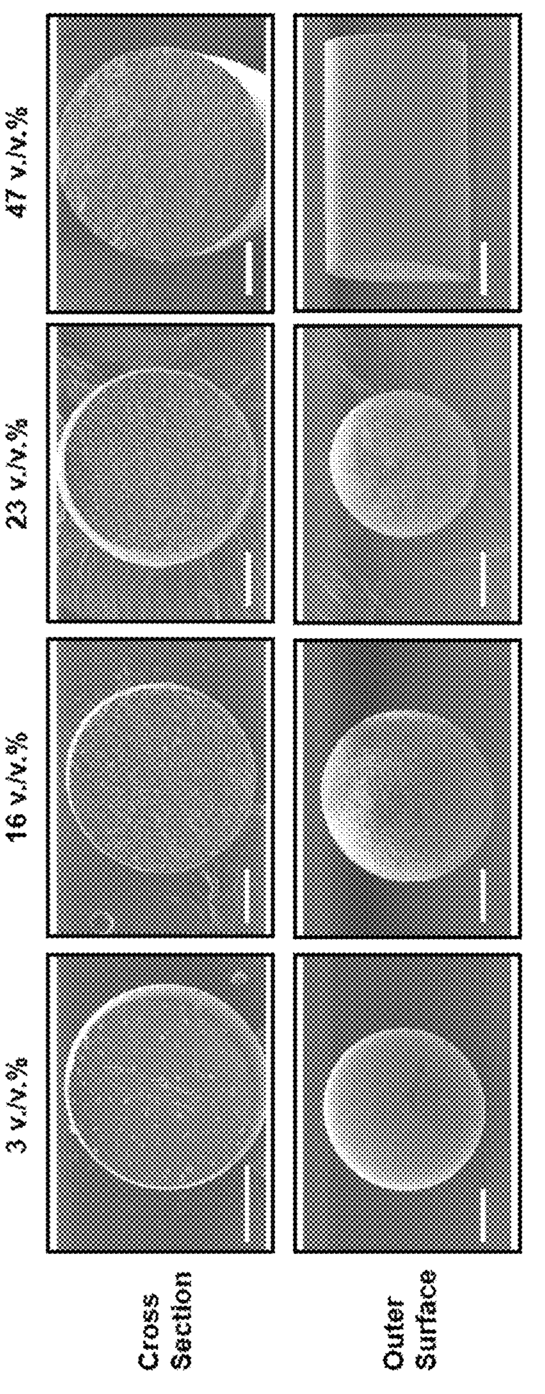
FIG. 16 illustrates the morphologies of the micro-magnets according to example embodiments, inspected by a scanning electron microscope (SNE-4500M SEM, Nanoimages) at 10 kV.

The micro-magnets were arrayed on a sample holder and imaged by an optical microscope (Keyence). An image processing algorithm (MATLAB) was implemented to characterize the dimensions of the micro-magnets. The algorithm performs noise filtering, binary-image conversion, and edge detection to yield the dimension information. The morphologies of the micro-magnets were inspected by a scanning electron microscope (SNE-4500M SEM, Nanoimages) at 10 kV (see FIG. 16).

Fabrication of the Cylindrical Micro-Magnets

To preferably produce micro-magnets with high magnetic remanence, requires a high ratio of NdFeB powder to PDMS, thereby causing the magnetic mixture to have a high viscosity. Thus, two techniques to fabricate the micro-magnets were explored. The drop break-off method was modified as described with reference to FIG. 15 to produce micro-magnets with a magnetic concentration of <33 v./v. %. As for the micro-magnets with a magnetic concentration of ≥33 v./v. %, they were fabricated using a casting method. The reasons are twofold: first, the high viscosity of the magnetic mixture would not flow through the PTFE tube (with a diameter of 300 μm and 500 μm) steadily. Second, the high viscosity of the magnetic mixture would generate a high frictional heat when the mixture is flowing through the PTFE tube, thereby rapidly curing the mixture within the tube.

For the casting method, magnetic mixtures with different magnetic concentrations (i.e., ≥33 v./v. %) were prepared in the same way as for the spherical micromagnets (see Table 1). The magnetic mixture was then injected into a PTFE tube with an inner diameter of 300 μm. Next, the mixture-filled tube was placed vertically in an oven at 70° C. for 30 minutes for curing. Subsequently, the cured mixture was carefully de-molded from the PTFE tube and cut into 500 μm in length for magnetization by the Vibrating-Sample Magnetometer (VSM) (Lake Shore Cryotronics). The magnetic cylinders were magnetized by the VSM at 2 T for 1 minute.

Investigation of the Stability of the Micro-Magnets According to Example Embodiments To investigate the stability of the micro-magnets, a series of environment endurance tests were performed. The investigations revealed that the micro-magnets can withstand a large temperature range (4-50° C.) and physical impacts, while maintaining their magnetization by emanating a constant magnetic flux density (see FIG. 17(A)-(C)). It was found that the micro-magnets could swell in the presence of organic solvents.

Quantification of the Swelling of the Micro-Magnets for use in Example Embodiments The compatibility of the micro-magnets with the liquid carrier is important for the performance of the sensor according to example embodiments. It was found that the PDMS of the micro-magnets swells in the presence of organic solvents, and this phenomenon would cause the micro-magnets to enlarge in size, affecting their moving velocities in the microfluidic channel with the potential of getting stuck in the channel.

To prevent the swelling of the micro-magnets, a perfluoropolyether (PF) oil (i.e., GPL101, Krytox) was chosen as the liquid carrier for the micro-magnets in the sensors according to example embodiments. The GPL 101 oil possesses remarkable properties such as low-viscosity and high-thermal stability. The micro-magnets were immerged in GPL 101 oil, mineral oil, and silicone oil for two weeks to evaluate the swelling of the micro-magnets. The swelling of the micro-magnets, as follows, $$\frac{D_t - D_i}{D_i} \times 100\% \tag{6}$$

where $D_t$ and $D_i$ are the respective diameters of the micro-magnets before and after the experiments.

Figure 18:
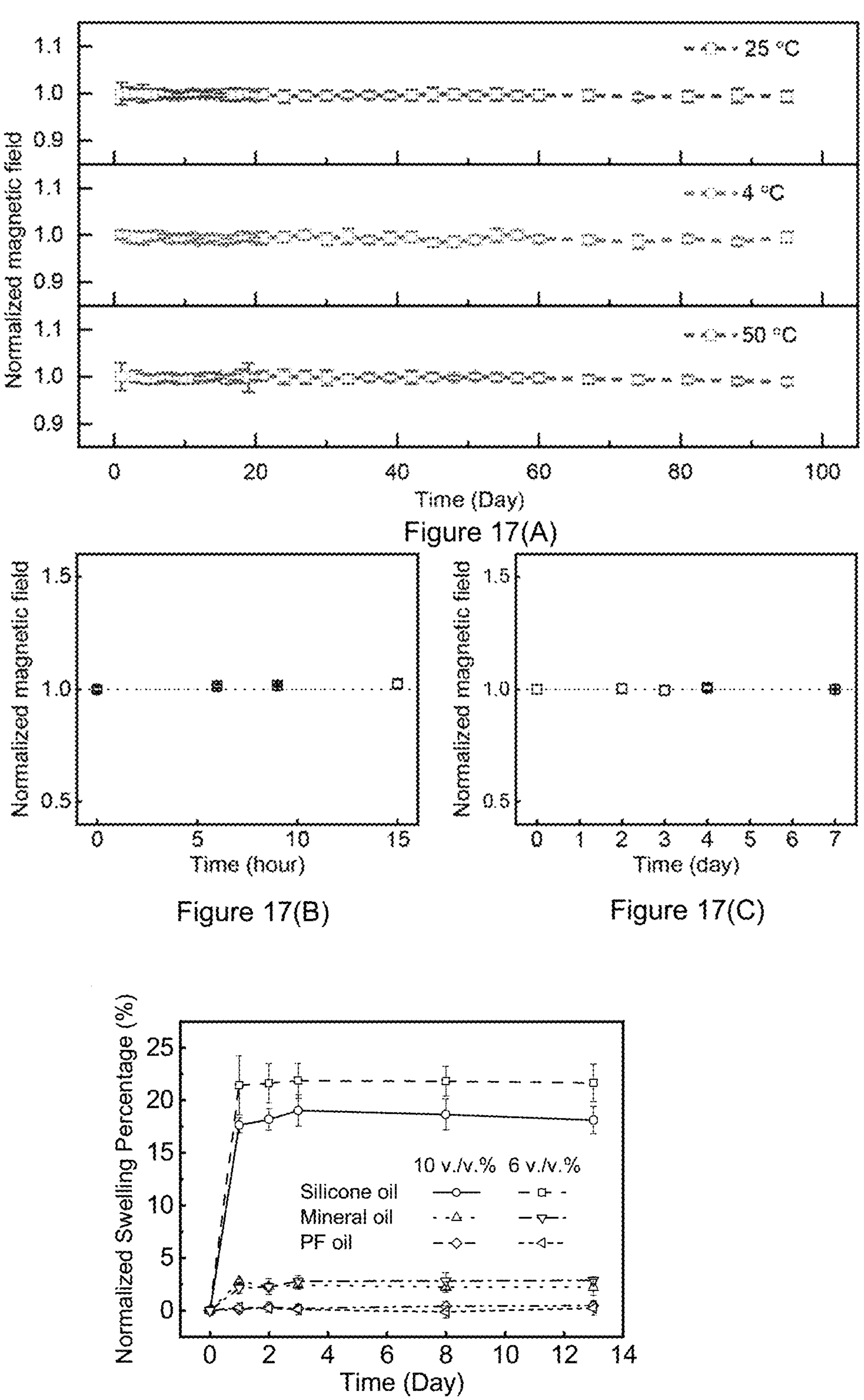
FIG. 18 illustrates investigating swelling of the micro-magnets submerging in different liquid mediums (i.e., silicon oil, mineral oil and PF oil) according to example embodiments.

From the results in FIG. 18, the perfluoropolyether (PF) oil (GPL101, Krytox), which is a low-viscosity fluid with high thermal stability, was used in example embodiments as the liquid carrier for the micro-magnets.

Analytical Model for the Voltage Pulse According to an Example Embodiment

The micro-magnets flowing through a helical coil were considered as a cylindrical magnet of length L and radius R. Specifically, two connecting spherical magnets are modelled as one cylindrical magnet. It is noted that there is slight deviation coming from the magnets shape, and the deviation is corrected by a calibration factor which is discussed below. The magnetic field along the longitudinal axis of the cylindrical magnet is expressed as:

$$B_z \frac{\mu_0 M_r}{2}\left[\frac{z}{\sqrt{z^2+R^2}} - \frac{z-L}{\sqrt{(z-L)^2+R^2}}\right] \tag{7}$$

where $M_r$ is the remanent magnetization and $\mu_0$ is the magnetic constant.

Using equation (7), the magnetic field gradient of the cylindrical magnet was derived, which is described by:

$$\frac{dB_z}{dz} = \frac{\mu_0 M_r}{2}\left[\frac{R^2}{(R^2+z^2)^{3/2}} - \frac{R^2}{(R^2+(L-z)^2)^{3/2}}\right] \tag{8}$$

To compute the voltage pulse $U_l$ of the micro-magnets flowing through a circular wire loop, $$U_l = \frac{d\Phi}{dt} = A\frac{dB_z}{dz}V_z \tag{9}$$

where A is the area of the wire loop and $V_z$ is the moving velocity of the micro-magnets through the wire loop.

Using Equation (9), the voltage pulse of the micro-magnets flowing through a helical coil is the superposition of the induced voltage pulse of every circular wire loop of the helical coil, that is:

$$U = \sum_{l=1}^{N} U_l \tag{10}$$

where l is the index of the circular wire loop and N is total number of turns of the helical coil. The experimental results were quantitively compared with the predicted voltage pulses from the analytical model. It was found that there were discrepancies between the measured and calculated values due to intrinsic material properties differences from an ideal analytical equation. However, by introducing a corrective calibration factor of 0.32 multiplied to the predicted voltage pulses, it was possible to achieve a good agreement between the two results.

Signal Conditioning Circuits Used in Example Embodiments

Figures 19A, 19B:
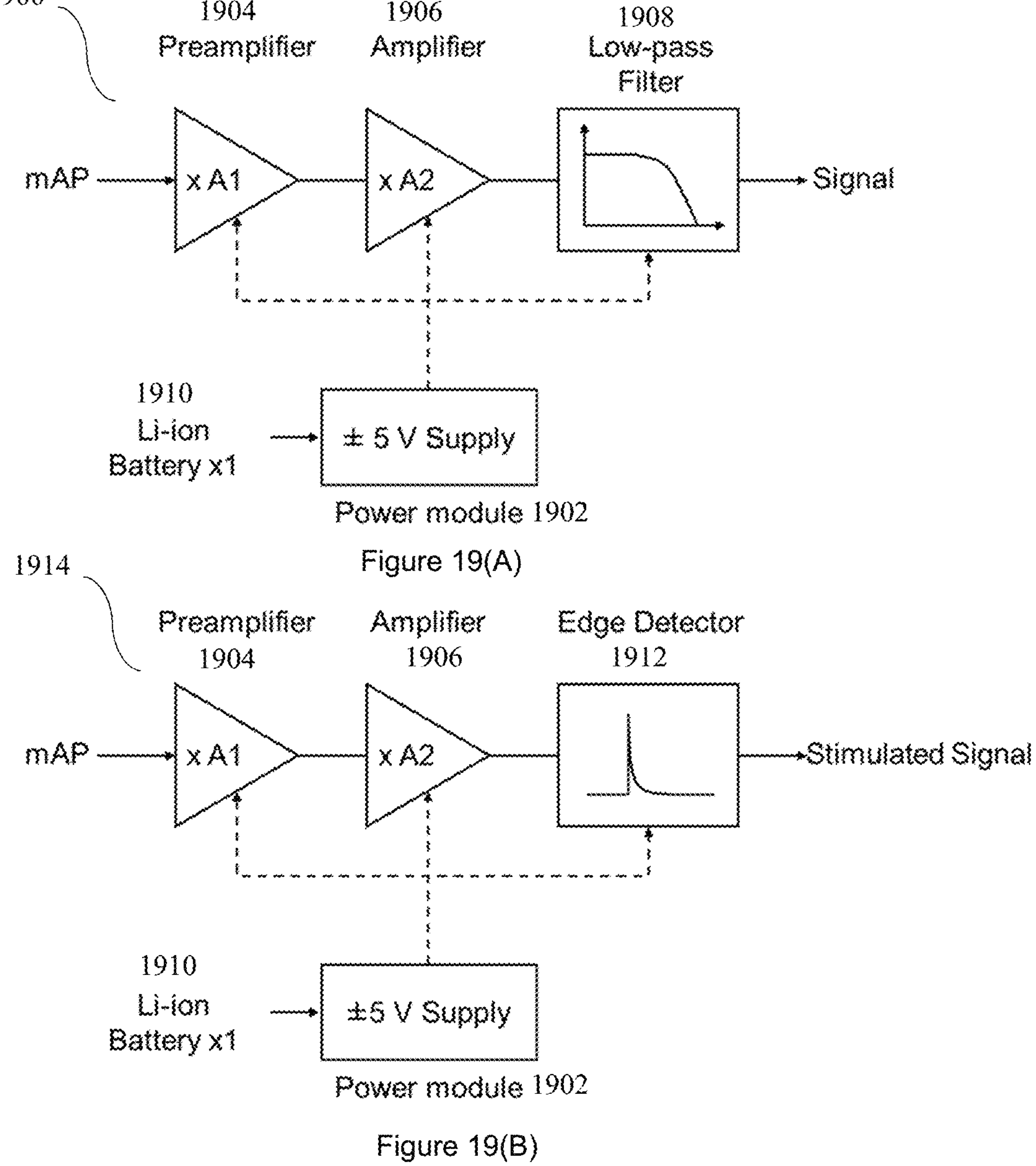
FIG. 19(A) illustrates a signal conditioning circuit used for sensor characterization in example embodiments.
FIG. 19(B) illustrates a modified signal conditioning circuit used for the hippocampal electrical stimulation in example embodiments.

The signal conditioning circuit 1900 used in example embodiments comprises a power module 1902, two ultra-low-noise amplifiers 1904, 1906, and a low-pass filter 1908 (see FIG. 19(A)). The output of a Li-ion battery 1910 was converted into a ±5V power supply via the power module 1902 which includes two voltage regulators (Analog Devices) and a dual-output converter (Texas Instruments). The voltage pulses were amplified by the two operational amplifiers 1904, 1906 (Analog Devices). Next, the low-pass filter 1908 was implemented to remove the high-frequency noise of the amplified voltage pulses. The resultant signals were then digitized with 8-bit resolution at 250 kHz using an oscilloscope (Pico Technology). Decoding was performed offline (MATLAB).

To facilitate the voltage pulses for the electrical stimulation of the mouse hippocampal slice, the low-pass filter was removed, and an edge-detector circuit 1912 was included in a modified signal conditioning circuit 1914 to generate the monophasic positive pulses (with ~100 μs pulse width) (see FIG. 19(B)). The edge-detector circuit 1912 comprises a voltage comparator (Maxim Integrated), a capacitive high-pass filter, and a half-wave precision rectifier. The half-wave precision rectifier was constructed with an operational amplifier (Analog Devices) and two switching diodes (ON Semiconductor).

Characterization of the Sensor According to Example Embodiments

Figure 20:
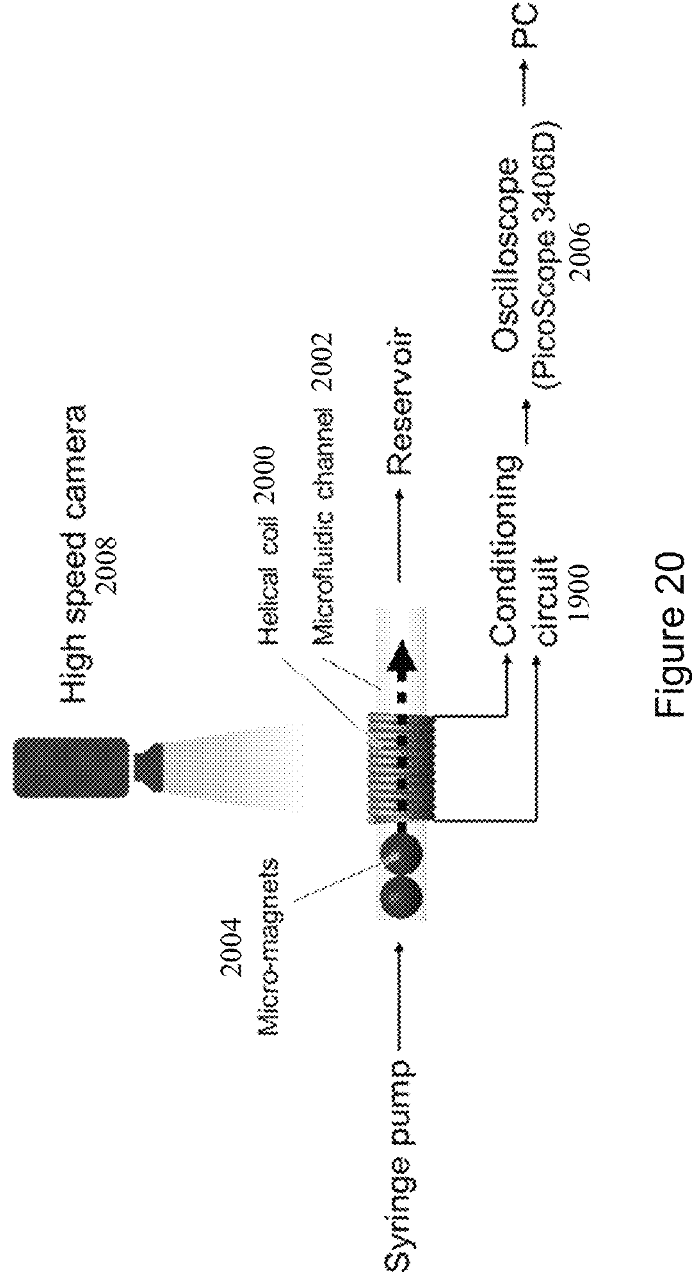
FIG. 20 illustrates voltage pulses characterization of the sensor according to example embodiments.

A helical coil 2000 of 12 turns (of insulated copper wire) was wound tightly around a microfluidic channel 2002 of 0.6 mm diameter (see FIG. 20). The inlet of the microfluidic channel 2002 was connected to a syringe (filled with GPL 101 oil) (not shown) via a PTFE tube (not shown). The micro-magnets 2004 were placed at the outlet of the syringe, and a syringe pump (Harvard Apparatus) was then implemented to dispense the oil (in range of 100 to 500 mL/h) and displace the micro-magnets 2004 through the helical coil 2000. The two terminals of the helical coil were connected to the signal conditioning circuit 1900 (see FIG. 19(A)), and the resultant voltage pulses were recorded at 250 kHz using an oscilloscope 2006 (Pico Technology). A high-speed camera 2008 (240 fps) was utilized to track the micro-magnets 2004 in the microfluidic channel 2002. Next, an image processing algorithm (MATLAB) was used to acquire the actual moving-velocity of the micro-magnets 2004 displacing through the helical coil 2000.

Encoding Scheme of the Sensor According to Example Embodiments

As described above, when a pressure stimulus is sensed by the sensor, the micro-magnets would traverse through the helical coils and evoke voltage pulses. The increase/decrease of the amplitude of the sensed pressure stimulus results in the micro-magnets to traverse forward/backward through the helical coils, respectively (see e.g., FIG. 6(A)). The distance travelled by the micro-magnets (in the sensor) contains information regarding the amplitude of the sensed pressure stimulus, which is encoded as a combinatorial sequence of voltage pulses.

The polarity ($P_L$) of an evoked voltage pulse (see e.g., FIG. 1(B)) is determined by the amplitude ($A_p$) of the first peak of the electrical signal, which is described by:

$$P_L = \begin{cases} +1, & A_p \geq 0 \\ -1, & \text{otherwise} \end{cases}. \tag{2}$$

The position of the micro-magnets (in the sensor) is tracked by alternating the $P_L$ of the evoked voltage pulse as the micro-magnets traverse forward/backward through the helical coils (see e.g., FIG. 6(A)), that is:

$$P_L = (-1)^{(n-1)} \tag{1}$$

where n is the index of the helical coil. Note that when the traversing direction of the micro-magnets changes, the subsequent evoked voltage pulse would possess the same $P_L$ with the one induced previously (see e.g., FIG. 6(A)). This encoding scheme is made possible by serially connecting the terminals of the helical coils with the same polarity together (see FIG. 5(A), inset). The spacing between the helical coils was optimized such that the evoked voltage pulses were not superimposed.

Fabrication of the Sensor According to an Example Embodiment

The sensor according to an example embodiment comprises three major components: a serially-connected array of coils, a pressure-sensing diaphragm, and the micro-magnets. Table 3 summarizes the details of fabricated sensors according to example embodiments for different applications.

TABLE 3

| Application | Number of helical coils | Number of turns (per coil) | Spacing between coils (mm) | Volume of the liquid carrier (μL) | Volume of the microfluidic channel (μL) | Volume of air column (μL) | With a vent | Thin form factor |
|---|---|---|---|---|---|---|---|---|
| Tunable sensitivity | 5 | 12 | 4 | 15 | 31.5 | 16.5 | No | No |
| | 5 | 12 | 4 | 12.5 | 31.5 | 19 | No | No |
| | 5 | 12 | 4 | 10 | 31.5 | 21.5 | No | No |
| | 5 | 12 | 4 | 7.5 | 31.5 | 24 | No | No |
| Stability (cyclic test) | 2 | 12 | 4 | 15 | 31.5 | 16.5 | No | No |
| Low detection limit | 2 | 3 | 3 | 7.5 | 31.5 | 24 | No | No |
| Underwater pressure sensing | 16 | 3 | 6 | 51.5 | 51.5 | — | Yes | No |
| Underwater object recognition task | 10 | 3 | 4 | 32.5 | 32.5 | — | Yes | Yes |
| Smart sensing | 1 | 12 | — | 7.5 | 31.5 | 24 | No | No |
| | 1 | 1 | — | 15.2 | 40.2 | 25 | No | Yes |
| Electrical stimulation of rat hippocampus | 1 | 12 | — | 12.5 | 31.5 | 19 | No | No |

Figure 21:
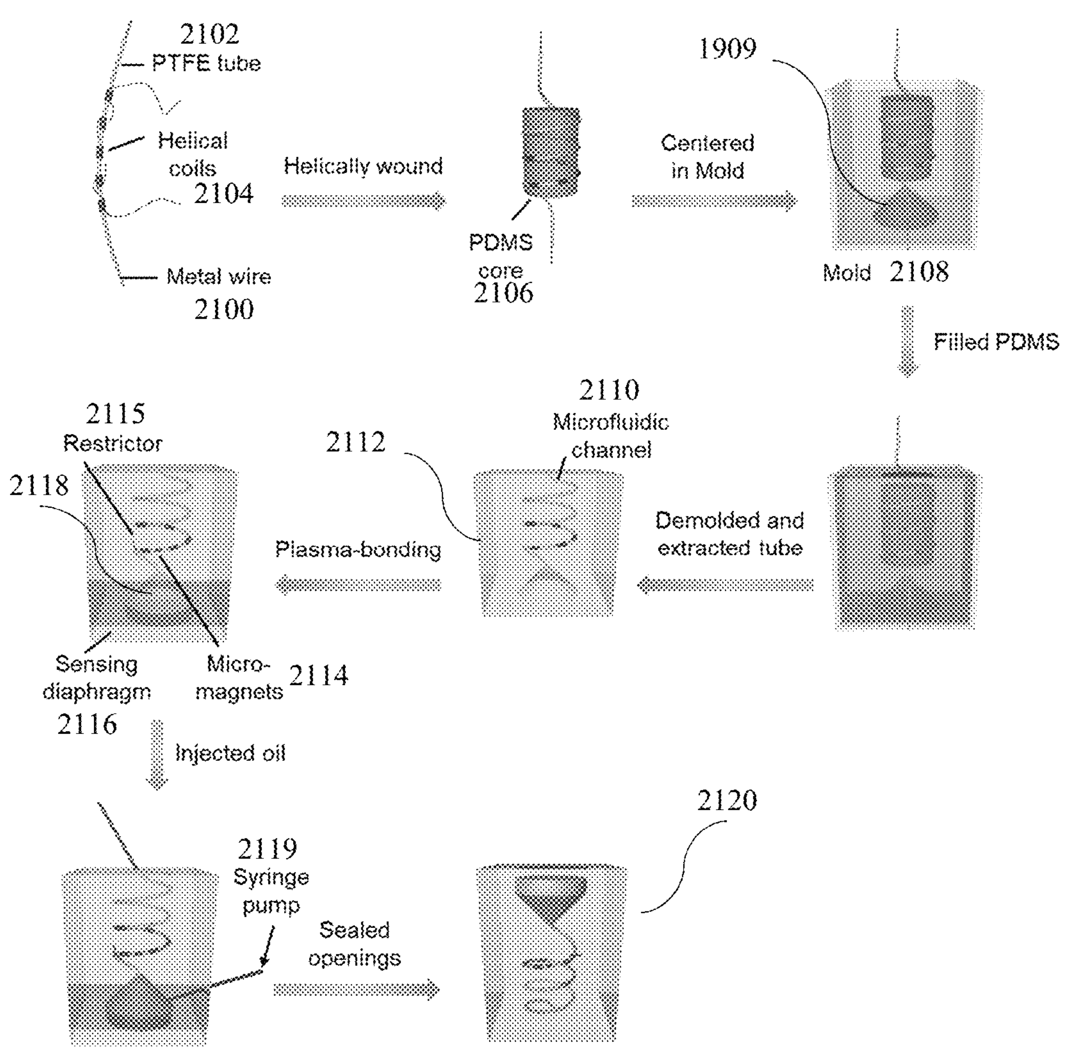
FIG. 21 illustrates fabrication of a sensor according to an example embodiment.

With reference to FIG. 21, the serially-connected array of coils was fabricated by first inserting a metal wire 2100 into a PTFE tube 2102, and then winding five helical coils 2104 (of 12 turns) on the tube 2102. The helical coils 2104 were made with insulated copper wire and were spaced 4 mm apart. The coils 2104 were electrically connected in series by the soldering method. The PTFE tube 2102 was wound on a cylindrical-core 2106, made of PDMS (pre-polymer-to-curing agent ratio of 5:1 (w/w)). The core 2106 was positioned in the centre of a 3D printed mould 2108, with a conical protrusion 2109 at the bottom for forming the diaphragm reservoir. PDMS (pre-polymer-to-curing agent ratio of 5:1 (w/w)) was then filled into the mould 2108. After degassing and curing at 70° C. for 3 hours, the array of coils 2104 was integrated inside the elastomer material. The cured PDMS was removed from the mould, and the microfluidic channel 2110 was formed by extracting the PTFE tube 2102 and the metal wire 2100 out of the cured PDMS. Here, the body 2112 of the sensor was established.

Next, two micro-magnets 2114 (coated with GPL 101 oil) were inserted into the microfluidic channel 2110. A restrictor 2115 (in this example embodiment in the form of a piece of metal wire with 0.4 mm diameter, pierced through the microfluidic channel 2110) was introduced to constrain the movements of the micro-magnets 2114 within the channel 2110. A pressure-sensing diaphragm 2116 (made of PDMS) was plasma-bonded to the side of the cured PDMS with the conical reservoir 2118. Following, a fixed volume of GPL 101 oil (i.e., the liquid carrier for the micro-magnets) was injected via a syringe pump 2119 at a fixed flow rate of 0.05 ml/h. A fixed amount of oil is injected via the syringe pump 2119 with a low flow rate, listed in Table 3. By controlling the volume and flow rate, the channel 2110 is not fully filled with oil for creating the air column in an example embodiment. Lastly, all the injection openings on the sensor 2120 were sealed using PDMS (pre-polymer-to-curing agent ratio of 5:1 (w/w)).

Fabrication Details of the Sensor with Thin Form Factor According to an Example Embodiment As mentioned above with reference to FIG. 9, the sensor can be designed into a thinner form factor to suit different applications, according to example embodiments. The three-dimensional helical coils were re-designed into two-dimensional conductive traces 904. These traces were patterned on a Pyralux substrate of 18 μm thickness (Pyralux AP7457E, Dupont) via photolithography (MJB4 Mask Aligner, SUSS MicroTec) and wet-etching (H2O2/HCL etchant). It is noted that the copper traces possess the same characteristics and perform the same function as the helical coils.

Figure 22:
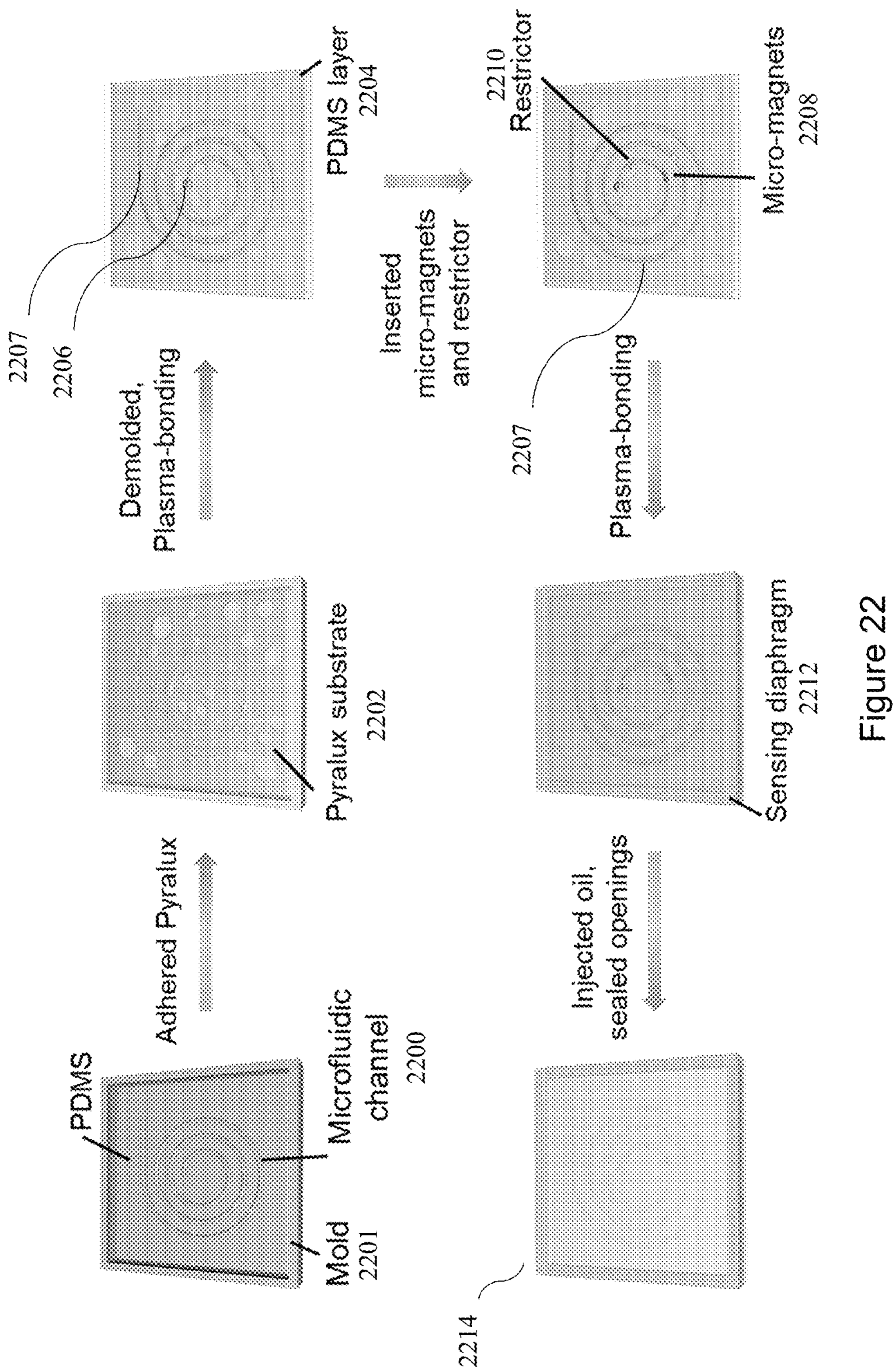
FIG. 22 illustrates fabrication of a sensor according to another example embodiment.

Next, with reference now to FIG. 22, a spiral microfluidic channel 2200 was cast using a 3D printed mould 2201 (Aureus Plus, EnvisionTEC) with PDMS. The conductive trace patterned Pyralux substrate 2202 was adhered to the bottom-side of the microfluidic channel in the mold 2201 using PDMS. A PDMS-layer 2204 of 1 mm thickness with an opening 2206 (of 1 mm diameter) was plasma-bonded to the top-side of the microfluidic channel 2207 on the demolded Pyralux substrate 2202 to close it. Two micro-magnets 2208 (coated with GPL 101 oil) were inserted into the microfluidic channel 2207 via the opening 2206. A restrictor 2210 (in this example embodiment in the form of a piece of metal wire with 0.4 mm diameter, pierced through the microfluidic channel) was then introduced to constrain the movements of the micro-magnets within the channel 2207. A pressure-sensing diaphragm 2212 (made of PDMS) was plasma-bonded to the PDMS-layer 2204. A fixed volume of GPL 101 oil (i.e., the liquid carrier for the micro-magnets 2208) was injected into the microfluidic channel 2207 via a syringe pump at a fixed flow rate of 0.05 ml/h. All the injection openings on the sensor 2214 were sealed using PDMS. It is noted that all the PDMS used here have a pre-polymer-to-curing agent ratio of 5:1 (w/w).

Characterization of the Sensor According to an Example Embodiment

A vertical load was applied and removed from the pressure-sensing diaphragm of the sensor by a motorized z-axis linear stage (Newmark) with force feedback from the force gauge (Mark-10). A flat circular indenter (of 2.5 mm in radius) was mounted on the linear stage to exert the load on the sensor for the experiments. The evoked voltage pulses were amplified by the signal conditioning circuit (see FIG. 19(A)). The amplified signals with the corresponding force readings were recorded simultaneously at 250 kHz using an oscilloscope (PicoScope 3406D, Pico Technology).

The performance and the sensitivity of the sensor was characterized by applying and removing the vertical load in the range of 17 to 166 kPa. The vertical loads were applied and removed at a speed in the range of 2 to 5 mm/s. The recorded voltage pulses were decoded offline (MATLAB) to retrieve the travelled distance of the magnetic field sources in the sensor. Next, the least-squares approach was utilized to acquire the transfer function of the sensor, that is, correlating the travelled distance of the micro-magnets to the applied pressure (i.e., vertical load). The slope of the transfer function represents the sensitivity of the sensor.

A sensor according to an example embodiment was optimized for low pressure detection, and it was characterized by applying and removing a vertical load at a speed of 1 mm/s. Similarly, the recorded voltage pulses were decoded offline (in MATLAB) to retrieve the transfer function and the low detection limit of the sensor.

The stability of the sensor was demonstrated by using the linear stage to exert a cyclic load of 12.7 kPa on the sensor for 1,200 times.

Decoding Scheme for the Sensor According to an Example Embodiment

The performance of the sensor according to an example embodiment was characterized by applying and removing a vertical load on the pressure-sensing diaphragm. Here, the combinatorial sequences of voltage pulses was decoded to retrieve the travelled distances of the micro-magnets. The decoded results were correlated with the amplitude of the applied pressure stimuli.

The number of helical coils (h) that the micro-magnets have traversed forward through were first determined by tracking the alternating $P_L$ of the evoked voltage pulses. Next, the distance travelled (D) by the micro-magnets (in the sensor), which is due to the applied pressure stimulus was approximated by:

$$D = hD_c + (h-1)D_s + D_x \tag{3}$$

where $D_c$ is the travelled distance of the micro-magnets between the peak-to-peak time of an evoked voltage pulse (see FIG. 7), $D_s$ is the travelled distance of the micro-magnets between the evoked voltage pulses, and $D_x$ is the estimated travelled distance of the micro-magnets between the last evoked voltage pulse and the position where the micro-magnets have stopped moving (before changing their moving direction to return to the initial position). Note that $D_c$ and $D_s$ are invariant to the moving velocity of the micro-magnets and their values were derived from the proposed analytical model for predicting the voltage pulses.

The $D_x$ was estimated by:

$$D_x = \frac{\Delta T_x}{2} V_q = \frac{\Delta T_x}{2} \frac{D_c}{\Delta T_c} \tag{4}$$

where $V_q$ is the moving velocity of the micro-magnets traversing through the sensor before stopping (and changing their moving direction to return to the initial position), $\Delta T_c$ is the peak-to-peak time of the last evoked voltage pulse (before the micro-magnets change their moving direction to return to the initial position), and $\Delta T_x$ is the time-interval between the two evoked voltage pulses that possess the same $P_L$ (see e.g. FIG. 6(A)). The $D_x$ was estimated under the assumption that the micro-magnets changed their moving direction immediately upon releasing the applied pressure stimulus. The decoding scheme is scripted in MATLAB.

Underwater Pressure Sensing According to an Example Embodiment

A conventional piezoresistive (i.e., PEDOT:PSS[23]) tactile sensor was fabricated to compare the performance with the sensor according to an example embodiment (with a vent) Both sensors were integrated with a commercial force sensor (Tekscan) to measure the amplitude of the external applied pressure. The output signals of the sensor according to an example embodiment, the piezoresistive tactile sensor, and a force sensor were measured via an oscilloscope (Pico Technology), a source-meter (Keithley), and a microcontroller (Arduino), respectively.

The piezoresistive tactile sensor and the sensor according to an example embodiment were attached at the bottom of a water column of 1.7 m-height, and the ambient pressure on the sensors was controlled by increasing the amount of water in the column (see FIG. 10(A)). First, piezoresistive tactile sensor and the sensor according to an example embodiment were subjected to different ambient pressures by filling up the water column. Next, external pressures were applied on the piezoresistive tactile sensor and the sensor according to an example embodiment via a 1.8 m-long indenter using hand.

Underwater Object Recognition With Spiking Neural Network According to an Example Embodiment Two sensors according to example embodiments were fabricated and demonstrated as underwater tactile sensors. With reference again to FIG. 11(A), the robotic gripper 1102 was custom-designed to integrate with the sensors 1104 for the underwater object recognition task. The robotic gripper 1102 was made of acrylic, and it was actuated using a servo-motor (HS-322HD, HiTEC) controlled by a LabVIEW program.

A dataset was constructed by using the robotic gripper 1100 to grasp objects under the water and (at least) 100 trials were conducted for each object. The resultant output signals of the sensors were recorded for 4 s at 50 Hz using an oscilloscope (Pico Technology). The objects used for the underwater object recognition task include (i) dishwashing sponge, (ii) Ecoflex ball, (iii) Lego tyre, (iv) magnetic tin can, (v) PDMS ball, (vi) plastic bottle, and (v) slime stress ball (see FIG. 11(B)).

The dataset was classified using a Spiking Neural Network (SNN). Here, a CNN was translated into SNN by training the neural network with the rate-based implementation of leaky integrate-and-fire neurons, and then replacing these neurons with the actual spiking ones for inference. The dataset was normalized by implementing Maximum-Absolute Scaling. The SNN includes two 1D-convolutional layers (with a kernel size of 5 and a stride length of 1) and an output layer (size of 7). The first and second convolutional layers consist of 10 and 40 filters, respectively. The SNN was developed in Python using TensorFlow, NengoDL, and NengoLoihi, and it was trained for 10 epochs (with a batch size of 1) to minimize the sparse categorical cross-entropy loss using the RMSProp optimizer. The SNN was trained repeatably for 10 times on random train-test (80%-20%) splits, and the average confusion matrix is reported in FIG. 11(C). In addition, the trained SNN was also implemented on the Intel Loihi neuromorphic chip via the Intel Neuromorphic Research Community cloud service for inference.

Smart Sensing With Machine Learning According to an Example Embodiment

Four sensors according to example embodiments were fabricated and each sensor was encoded with a unique voltage pulse signature. A dataset was constructed with the sensors by pressing one at a time by hand and 50 trials were conducted for each sensor. The resultant output signals from the sensors were recorded for 0.5 s at 5 kHz using an oscilloscope (PicoScope 3406D, Pico Technology).

The dataset was classified using a Convolution Neural Network (CNN) to learn the unique voltage pulse signatures of the sensors. The dataset was normalized by implementing Maximum-Absolute Scaling. The first layer of CNN is a 1D-convolutional layer with 256 filters, followed by another 1D-convolutional layer with 128 filters. Both convolutional layers have a kernel size of 3 and a stride length of 1. Lastly, the learned features are flattened and passed into an output layer of size 4 with an activation function of Softmax for classification. The CNN was developed in Python using TensorFlow, and it was trained for 25 epochs (with a batch size of 3) to minimize the sparse categorical cross-entropy loss using the RMSProp optimizer. The CNN was trained repeatably for 10 times on random train-test (80%-20%) splits, and the average confusion matrix is reported in FIG. 12(B).

The two-by-two sensor array was implemented by serially connecting the four sensors. The sensor array was demonstrated as a controller in playing the Tetris® video game in real-time, and each sensor corresponds to a moving direction. The resultant output signal of the sensor array was recorded for 0.5 s at 5 kHz using an oscilloscope (PicoScope 3406D, Pico Technology). The recorded signal was then transferred to the trained CNN for real-time inference.

Electrical Stimulation of the Mouse Hippocampal Slice According to an Example Embodiment All animal procedures were approved by the Institutional Animal Care and Use Committee (IACUC) of the National University of Singapore. A total of three male WT B16 mice were used in this study. Animals were housed under 12 h light/12 h dark conditions with food and water available ad libitum.

Animals were anaesthetised briefly using $CO_2$ and were decapitated, and the brains were quickly removed to 4° C. artificial cerebrospinal fluid (aCSF)—a modified Krebs-Ringer solution containing the following (in mM): 124 NaCl, 3.7 KCl, 1.2 $KH_2PO_4$, 1 $MgSO_4 \cdot 7\ H_2O$, 2.5 $CaCl_2 \cdot 2\ H_2O$, 24.6 $NaHCO_3$, and 10 D-glucose. The pH of the aCSF was between 7.3 and 7.4 when bubbled with 95% oxygen and 5% carbon dioxide (carbogen). Both right and left hippocampi were dissected out in the cold (2-4° C.) aCSF, while the aCSF was continuously bubbled with carbogen. Transverse hippocampal slices of 400 μm thickness were prepared from the right and left hippocampi using a manual tissue chopper (Stoelting, Wood Dale, Illinois), transferred onto a nylon net in an interface chamber (Scientific Systems Design, Ontario, Canada) and incubated at 32° C. at an aCSF flow rate of 1 ml/min and carbogen consumption of 16 l/h. The entire process of animal dissection, hippocampal slice preparation and placement of slices on the chamber was done within approximately five minutes to ensure that the hippocampal slices were in good condition for electrophysiology studies. The slices were incubated for at least three hours before conducting the experiments.

For the electrophysiology recordings, a monopolar lacquer-coated stainless-steel electrode (5 MΩ; AM Systems, Sequim) was positioned at an adequate distance within the stratum radiatum of the Cornu Ammonis (CA) CA1 region for stimulating a neuronal population (FIG. 14(A)), thus evoking field excitatory postsynaptic potentials (fEPSPs) from the Schaffer collateral/commissural-CA1 (Sc-CA1) synapses.

The stimulating electrode was connected to an isolated pulse stimulator (Model 2100, A-M Systems) and an sensor according to an example embodiment. The electrical stimulus induced by the sensor on the hippocampal slice was a monophasic negative pulse, with a pulse width of ~100 μs. Note that at each time instance only one stimulator was used to stimulate the hippocampal slice. The voltage pulse of the sensor was generated by pressing on the pressure-sensing diaphragm of the sensor by hand. The recorded responses were amplified by 1000 times, and an oscilloscope (Pico Technology) was utilized for data acquisition.

As described herein, embodiments of the present invention provide a self-powered spike-based sensing strategy to capture and transmit sensory information in the form of voltage pulses. Based on the sensing strategy, a self-spiking pressure sensor according to an example embodiment has been provided that is based on Faraday's law of electromagnetic induction. The sensor according to an example embodiment exhibits the following notable characteristics: (i) highly linear output response without hysteresis, (ii) self-powered, (iii) encoding of unique pulse signatures without complex electronic circuitry, and (iv) direct transduction of pressure stimuli into electrical pulse signals. The sensor according to an example embodiment was demonstrated in underwater pressure sensing to highlight its versatility and capabilities. The sensor according to an example embodiment is capable of withstanding a high ambient pressure while maintaining its highly linear output response. By leveraging on SNN, it was shown that the sensors according to example embodiments have the potential to be deployed for deep-sea object recognition task. A sensor array according to an example embodiment (made of the sensors according to example embodiments) was encoded with unique pulse signatures and a CNN for sensor identification was implemented. Importantly, the sensor array according to an example embodiment (that is synergized with the CNN) was functionalized as a controller in playing the Tetris video game, demonstrating the applicability of the sensors according to example embodiment for artificial intelligence applications. The voltage pulses evoked by the self-spiking pressure sensor according to example embodiments were shown to be compatible with the electrical stimulation of the hippocampus; the resulting responses recorded from a rat hippocampal slice were similar with the ones induced by a commercial isolated pulse stimulator. Embodiments of the present invention can be useful as a new platform for emerging neuromorphic sensors, neurorobotics, and human-machine interfaces.

In one embodiment, a system for generating an electrical signal responsive to a pressure input is provided, the system comprising a diaphragm configured to be subjected to the pressure input; a microfluidic channel with a first end thereof coupled to the diaphragm such that the pressure input generates a corresponding pressure change in the microfluidic channel; one or more magnets disposed in a carrier liquid in the microfluidic channel; and one or more coils disposed along the microfluidic channel and for generating the electrical signal based on Faraday effect by the magnets moving, under the pressure change in the microfluidic channel, through the respective coils.

The system may comprise a gas disposed in the microfluidic channel at a closed second end thereof such that the carrier liquid is disposed between the diaphragm and the gas, the second end being configured to prevent escape of the gas from the microfluidic channel during operation in an operating environment.

The microfluidic channel may have an open second end for ambient pressure invariant operation underwater. The carrier liquid may comprise water for the ambient pressure invariant operation underwater.

The system may comprise magnets of different magnetization for distinguishing backward and forward movements of the magnets through the respective coils based on the generated electrical signal.

The system may comprise two or more coils with terminals of the coils with the same polarity connected together for distinguishing backward and forward movements of the magnets through the respective coils based on the generated electrical signal.

The system may be configured in different form factors, including in a flat form factor or in a 3-D form factor.

The system may be configured to be flexible.

The system may comprise a processor unit for analyzing the generated electrical signal. The processor unit may be configured to identify different objects subjecting the diaphragm to the pressure input. The processor unit may comprise a Spiking Neural Network (SNN) and/or a Convolutional Neural Network (CNN).

The generated electrical signal may be applied to sensing applications and/or stimulation applications.

In one embodiment, a sensory system comprising a plurality of the systems for generating an electrical signal responsive to a pressure input according to an example embodiment is provided.

The sensory system may be, configured to identify which of the plurality of sensors has been subjected to the pressure. The one or more coils of the different sensors may be serially connected between a single conductor output and ground.

In one embodiment, a method for generating an electrical signal responsive to a pressure input using the system according to an example embodiment and/or the sensory system according to an example embodiment is provided.

The electrical signal generation may be performed under water.

Figure 23:
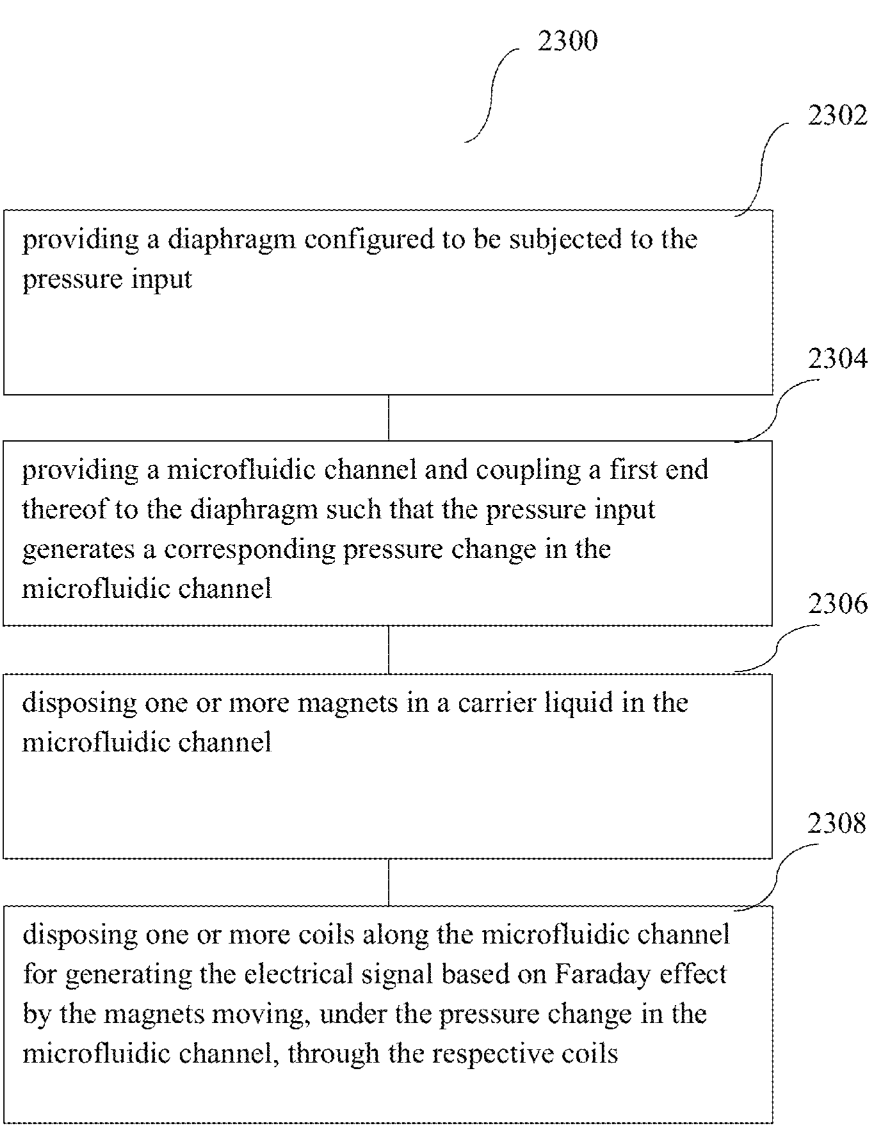
FIG. 23 shows a flow chart illustrating a method for fabricating a system for generating an electrical signal responsive to a pressure input, according to an example embodiment.

FIG. 23 shows a flow chart 2300 illustrating a method for fabricating a system for generating an electrical signal responsive to a pressure input, according to an example embodiment. At step 2303, a diaphragm configured to be subjected to the pressure input is provided. At step 2304, a microfluidic channel is provided and a first end thereof is coupled to the diaphragm such that the pressure input generates a corresponding pressure change in the microfluidic channel. At step 2306, one or more magnets is disposed in a carrier liquid in the microfluidic channel. At step 2308, one or more coils are disposed along the microfluidic channel for generating the electrical signal based on Faraday effect by the magnets moving, under the pressure change in the microfluidic channel, through the respective coils.

The method may comprise configuring a plurality of the systems for generating the electrical signal responsive to a pressure input into a sensory system.

Embodiments of the present invention can have one or more of the following features and associated benefits/advantages:

| Feature | Benefit/Advantage |
| --- | --- |
| Highly linear output response without hysteresis | The linear-transfer characteristic of the sensor according to an example embodiment allows a simple linear equation to be established for accurate mapping of the decoded results to the applied pressure amplitude. |
| Direct transduction of mechanical stimuli into electrical pulse signals | Mitigated the issues faced by conventional neuromorphic devices which require complex electronic circuitry and additional post-processing to convert their analog sensor outputs into spikes. |

-continued

| Feature | Benefit/Advantage |
|---|---|
| | The sensor according to an example embodiment exhibits the following notable features: produces a highly linear output response without hysteresis, even under high ambient water pressure capable of ambient pressure-invariant tactile sensing enables underwater tactile sensing Furthermore, the output signals of the sensor according to an example embodiment can be directly processed by machine learning algorithms (e.g., convolutional neural network) for inference. |
| Encoding of unique pulse signatures | The sensors according to example embodiments can be encoded with unique pulse sequences for sensor identification. This feature allows the sensors to be daisy-chained for signal propagation. The serial connection of the sensors with a single electrical conductor can greatly simplify the wirings for signaling. |
| Self-powered | The transduction design of the sensor according to example embodiments does not require additional energy for operation. |
| Flexible form factor | The physical form factor and performance of the sensor according to an example embodiment can be customized to suit different applications. It can be designed to retrofit onto end-effectors or to conform to 3D shapes and surfaces. |
| Ability to work under high ambient pressure | The mechanism according to an example embodiment allows for vented operations whereby ambient pressure does not cause device output saturation, it remains sensitive even under high ambient pressure |

Embodiments of the present invention can be applied to the field of underwater robotics. A common need in underwater and deep-sea robotic applications require grasping and recognition of objects. Tactile sensing augments the robot's perception of the physical world with information beyond what standard vision and auditory modalities can provide. Compared with vision, touch is insensitive to water turbidity and poor lighting conditions, thus making it robust to low visibility environments (e.g., oil spill situations). However, there is a dearth of sensors that allows for underwater tactile exploration. The sensors according to example embodiments can be integrated with robotic grippers to detect or identify underwater objects.

Power consumption is an important consideration for real-world applications, and the sensors according to example embodiments are self-powered. Importantly, spiking neural networks can be employed to directly process the output signals (evoked by the sensor according to an example embodiment) for inference. These neural networks can be implemented on a highly energy-efficient neuromorphic hardware (e.g., the Intel Loihi[23]) which requires lesser energy per inference as compared to a standard GPU based machine learning hardware.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize.

The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A system for generating an electrical signal responsive to a pressure input, the system comprising:

a diaphragm configured to be subjected to the pressure input;

a microfluidic channel with a first end thereof coupled to the diaphragm such that the pressure input generates a corresponding pressure change in the microfluidic channel;

one or more moveable magnets disposed in a carrier liquid in the microfluidic channel; and one or more coils disposed along the microfluidic channel and for generating the electrical signal based on Faraday effect by the magnets moving, under the pressure change in the microfluidic channel, through the respective coils:

the system including at least one of:

a gas disposed in the microfluidic channel at a closed second end thereof such that the carrier liquid is disposed between the diaphragm and the gas, the second end being configured to prevent escape of the gas from the microfluidic channel during operation in an operating environment;

an open second end of the microfluidic channel, wherein the carrier liquid comprises water for ambient pressure invariant operation underwater;

magnets of different magnetization for distinguishing backward and forward movements of the magnets through the respective coils based on the generated electrical signal; and a processor unit for analyzing the generated electrical signal, wherein the processor unit is configured to identify different objects subjecting the diaphragm to the pressure input.

2. The system of claim 1, comprising two or more coils with terminals of the coils with the same polarity connected together for distinguishing backward and forward movements of the magnets through the respective coils based on the generated electrical signal.

3. The system of claim 1, configured in different form factors, including in a flat form factor or in a 3-D form factor.

4. The system of claim 1, configured to be flexible.

5. The system of claim 1, comprising a processor unit for analyzing the generated electrical signal.

6. The system of claim 1, wherein the processor unit comprises a Spiking Neural Network (SNN) and/or a Convolutional Neural Network (CNN).

7. The system of claim 1, wherein the generated electrical signal is applied to sensing applications and/or stimulation applications.

8. A sensory system comprising a plurality of the systems for generating an electrical signal responsive to a pressure input of claim 1.

9. The sensory system of claim 8, configured to identify which of the plurality of sensors has been subjected to the pressure.

10. The sensory system of claim 9, wherein the one or more coils of the different sensors are serially connected between a single conductor output and ground.

11. A method for generating an electrical signal responsive to a pressure input using the system comprising:

a diaphragm configured to be subjected to the pressure input;

a microfluidic channel with a first end thereof coupled to the diaphragm such that the pressure input generates a corresponding pressure change in the microfluidic channel;

one or more moveable magnets disposed in a carrier liquid in the microfluidic channel; and one or more coils disposed along the microfluidic channel and for generating the electrical signal based on Faraday effect by the magnets moving, under the pressure change in the microfluidic channel, through the respective coils;

wherein the electrical signal generation is performed under water.

12. A method for fabricating a system for generating an electrical signal responsive to a pressure input, comprising the steps of:

providing a diaphragm configured to be subjected to the pressure input;

providing a microfluidic channel and coupling a first end thereof to the diaphragm such that the pressure input generates a corresponding pressure change in the microfluidic channel;

disposing one or more moveable magnets in a carrier liquid in the microfluidic channel; and disposing one or more coils along the microfluidic channel for generating the electrical signal based on Faraday effect by the magnets moving, under the pressure change in the microfluidic channel, through the respective coils;

the method including at least one of:

disposing a gas in the microfluidic channel at a closed second end thereof such that the carrier liquid is disposed between the diaphragm and the gas, the second end being configured to prevent escape of the gas from the microfluidic channel during operation in an operating environment;

providing an open second end of the microfluidic channel, wherein the carrier liquid comprises water for ambient pressure invariant operation underwater;

providing magnets of different magnetization for distinguishing backward and forward movements of the magnets through the respective coils based on the generated electrical signal; and providing a processor unit for analyzing the generated electrical signal, wherein the processor unit is configured to identify different objects subjecting the diaphragm to the pressure input.

13. The method of claim 12, comprising configuring a plurality of the systems for generating the electrical signal responsive to a pressure input into a sensory system.

* * * * *